United States Patent
Srivastava et al.

(10) Patent No.: US 11,704,495 B2
(45) Date of Patent: Jul. 18, 2023

(54) PREDICTION OF FILM SUCCESS-QUOTIENT

(71) Applicant: SONY GROUP CORPORATION, Tokyo (JP)

(72) Inventors: Anubhav Srivastava, Bangalore (IN); Sankaran Kesavan, Bangalore (IN); Parag Vaishnava, Bangalore (IN)

(73) Assignee: SONY GROUP CORPORATION, Tokyo (JP)

( * ) Notice: Subject to any disclaimer, the term of this patent is extended or adjusted under 35 U.S.C. 154(b) by 244 days.

(21) Appl. No.: 16/869,892

(22) Filed: May 8, 2020

(65) Prior Publication Data

US 2020/0372524 A1 Nov. 26, 2020

Related U.S. Application Data

(60) Provisional application No. 62/850,075, filed on May 20, 2019.

(51) Int. Cl.
*G06F 40/30* (2020.01)
*G06F 40/20* (2020.01)
(Continued)

(52) U.S. Cl.
CPC .............. *G06F 40/30* (2020.01); *G06F 18/23* (2023.01); *G06F 18/24* (2023.01); *G06F 40/20* (2020.01);
(Continued)

(58) Field of Classification Search
CPC .. G06Q 30/0202; G06F 40/20; G06K 9/6218; G06K 9/6267; G06N 20/00; G06N 3/0454
See application file for complete search history.

(56) References Cited

U.S. PATENT DOCUMENTS 8,841,534 B2 * 9/2014 Bonet ................ G06F 16/70
84/608
9,992,556 B1 * 6/2018 Price ................ G06F 16/433
(Continued)

FOREIGN PATENT DOCUMENTS

CN 104834969 A 8/2015
CN 106980909 A 7/2017
(Continued)

OTHER PUBLICATIONS

Mestyan, et al., "Eady Prediction of Movie Box Office Success Based on Wikipedia Activity Big Data", Plos One, Aug. 21, 2013, 09 pages.
(Continued)

*Primary Examiner* — Dylan C White
(74) *Attorney, Agent, or Firm* — Chip Law Group

(57) ABSTRACT

An information processing device and method for prediction of a film's success-quotient is provided. The information processing device receives a film script for a film for production, identifies a plurality of scenes in the film script based on a textual analysis of the film script, and computes a first score for each scene of the film script based on genre information for plurality of scenes. The information processing device further identifies a list of characters in the film script, selects an actor for roleplay of each character of the list of characters and computes a second score that indicates a suitability of the selected actor for the roleplay. The second score is computed based on a machine learning model that is trained on datapoints of a historical film database. The information processing device predicts the success-quotient for the film based on the computed first score and the computed second score.

19 Claims, 12 Drawing Sheets

(51) Int. Cl.
  *G06Q 30/0202* (2023.01)
  *G06F 18/23* (2023.01)
  *G06F 18/24* (2023.01)
  *G06N 3/047* (2023.01)
  *G06N 20/00* (2019.01)

(52) U.S. Cl.
  CPC ............. *G06N 3/047* (2023.01); *G06N 20/00* (2019.01); *G06Q 30/0202* (2013.01)

(56) References Cited

U.S. PATENT DOCUMENTS

| | | | |
|---|---|---|---|
| 10,748,215 B1* | 8/2020 | Winfield | G06N 20/10 |
| 10,861,097 B1* | 12/2020 | Winfield | G06N 20/00 |
| 10,984,477 B1* | 4/2021 | Winfield | G06K 9/6269 |
| 11,062,086 B2* | 7/2021 | Agrawal | G06F 40/137 |
| 11,188,833 B1* | 11/2021 | Tappin | G06F 40/30 |
| 11,269,941 B2* | 3/2022 | Schriber | G06F 3/0484 |
| 2006/0235783 A1* | 10/2006 | Ryles | G06Q 40/00 705/35 |
| 2013/0204664 A1* | 8/2013 | Romagnolo | G06Q 30/0203 705/7.32 |
| 2013/0311408 A1* | 11/2013 | Bagga | G06Q 30/02 706/12 |
| 2015/0170296 A1* | 6/2015 | Kautz | G06Q 10/00 705/319 |
| 2016/0189084 A1* | 6/2016 | Galuten | G06Q 50/188 705/7.32 |
| 2018/0330256 A1* | 11/2018 | Fang | G06Q 30/0202 |
| 2019/0295110 A1* | 9/2019 | Bessen | G06N 20/00 |
| 2020/0175457 A1* | 6/2020 | Tamilselvam | G06Q 10/06393 |
| 2020/0372524 A1* | 11/2020 | Srivastava | G06F 40/279 |
| 2021/0256543 A1* | 8/2021 | Bessen | G06F 40/279 |

FOREIGN PATENT DOCUMENTS

| | | |
|---|---|---|
| CN | 107404671 A | 11/2017 |
| CN | 107665373 A | 2/2018 |
| EP | 3340069 A1 | 6/2018 |

OTHER PUBLICATIONS

Lash, et al., "Early Predictions of Movie Success: the Who, What, and When of Profitability", Journal of Management Information Systems, vol. 33, No. 3, XP055726340, Dec. 7, 2016, pp. 874-903.

International Search Report and Written Opinion of PCT Application No. PCT/IB2020/054741, dated Sep. 11, 2020, 07 pages of ISRWO.

No Author, the box-office record of a Hollywood film, The structure of "Epagogix" predicted in a scenario stage, [onl ine] and Japan Data ScienceConsortium, Jan. 19, 2014.

* cited by examiner

FIG. 11

PREDICTION OF FILM SUCCESS-QUOTIENT

CROSS-REFERENCE TO RELATED APPLICATIONS/INCORPORATION BY REFERENCE

This application claims priority to U.S. Provisional Patent Application Ser. No. 62/850,075 filed on May 20, 2019, the entire content of which is hereby incorporated herein by reference.

FIELD

Various embodiments of the disclosure relate to textual processing, natural language processing (NLP), and machine learning (ML) methods. More specifically, various embodiments of the disclosure relate to an information processing device and method for prediction of a success-quotient for a film.

BACKGROUND

Film production houses, typically, receive a lot of film scripts as potential candidates for a film. These film production houses have a dedicated team to read, understand, and analyze each of the received film script for potential success factors of the film. Once such analysis is performed, there are other teams that decide which actors would be best for different roles in the film. As such analysis is mostly performed manually, therefore selection of appropriate cast and potential success factors is subject to human errors and is not optimal due to subjective opinions/biases. A poor analysis of the film script or a poor cast selection before production may affect the success of the film at the box office.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An information processing device and a method for prediction of film success-quotient is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

Figure 11:
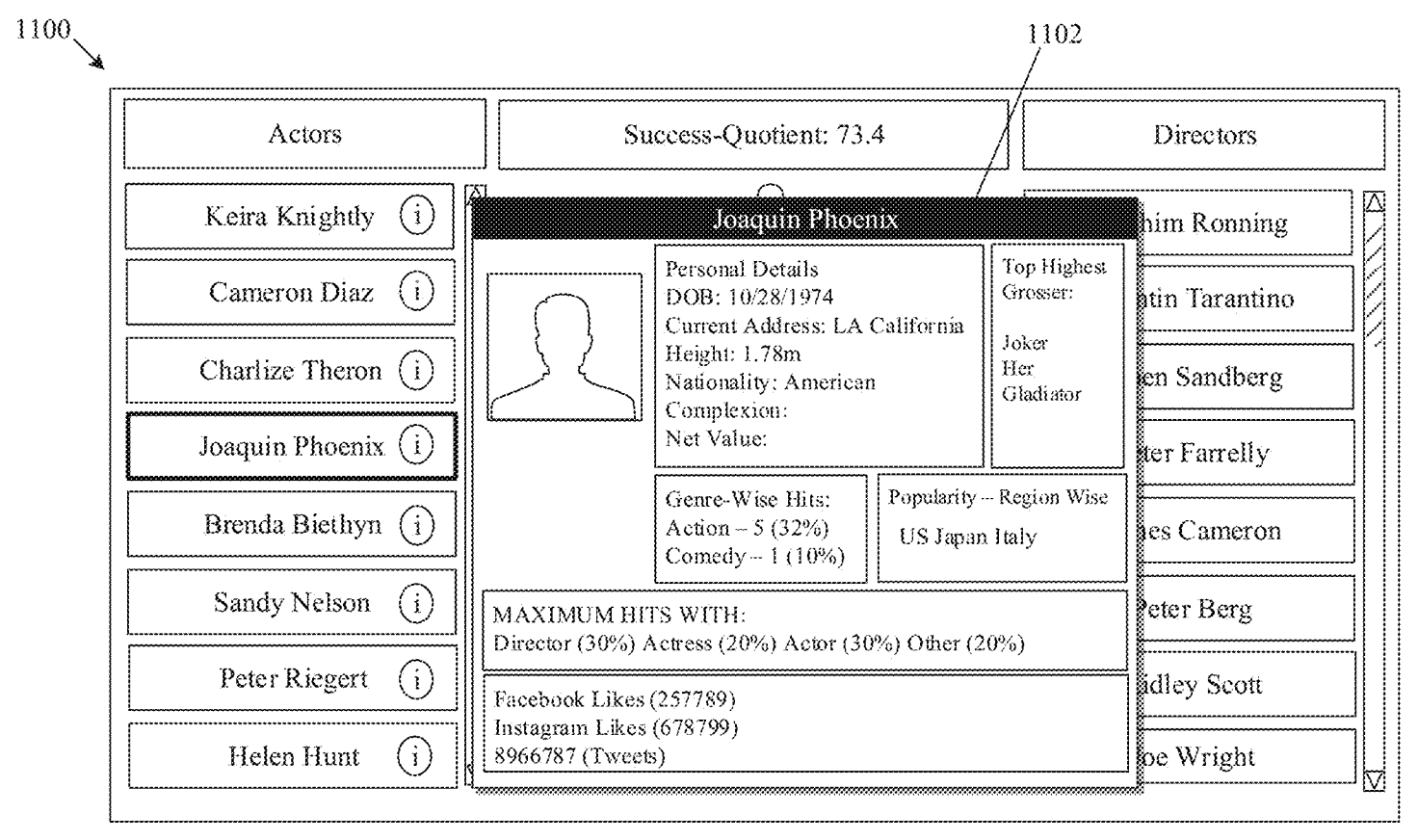

FIG. 11 is a diagram that illustrates a user interface (UI) element for visualization of actor details through the UI of FIG. 10, in accordance with at least one embodiment of the disclosure.

DETAILED DESCRIPTION

Figure 1:
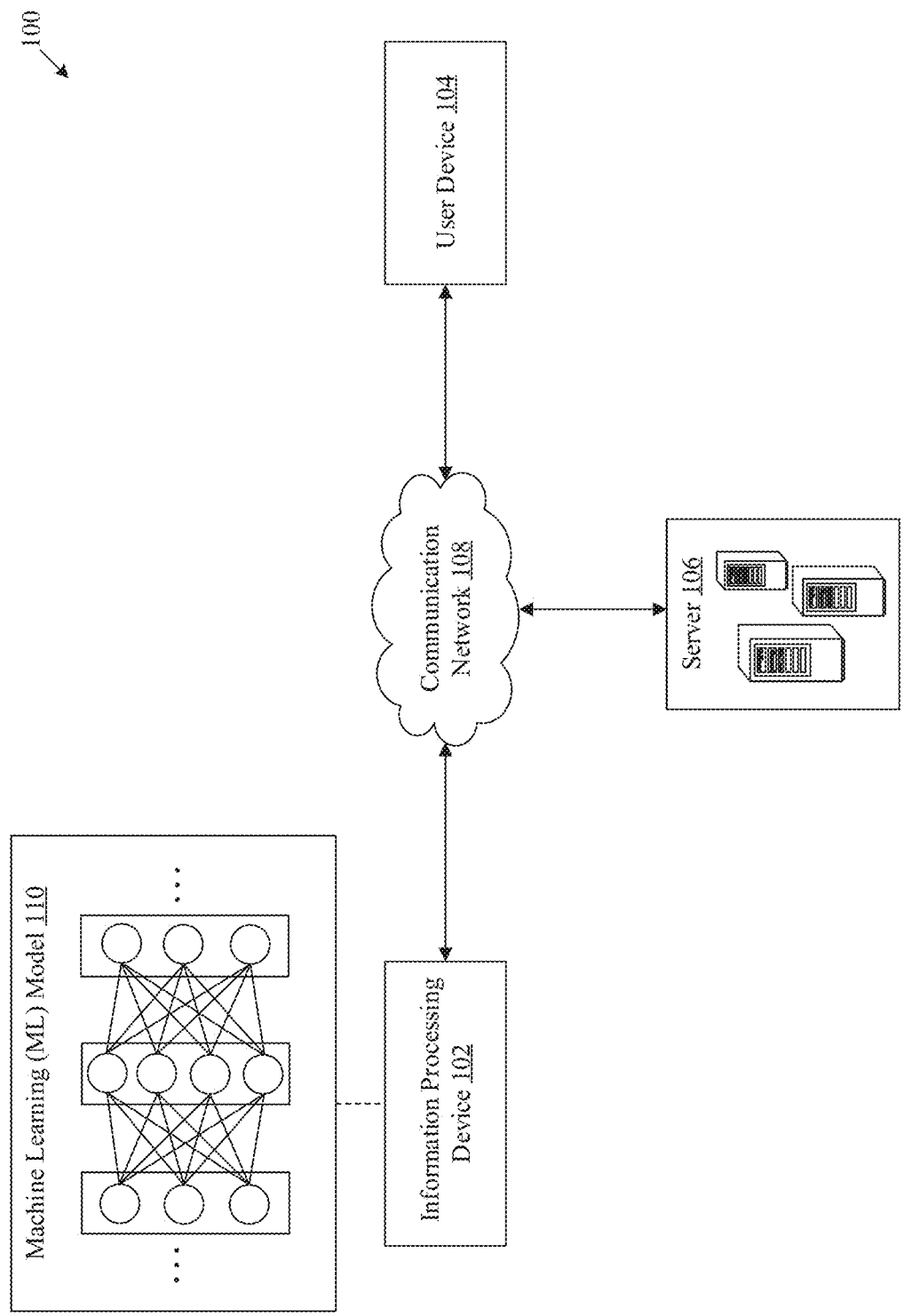
FIG. 1 illustrates an exemplary environment for prediction of a film's success-quotient, in accordance with an embodiment of the disclosure.

The following described implementations may be found in the disclosed information processing device and method for prediction of a film's success-quotient. Exemplary aspects of the disclosure provide an information processing device. The information processing device may aid film production houses to select film scripts which have better success chances at the box office, select suited actors/crew for the film, and predict a success-quotient which may be the indication of a success of a film at the box office. The success-quotient for the film may indicate how the film, produced based on the film script, will perform at box office (e.g., in terms of film ratings or earnings) or a measure of its potential popularity within a particular group or a demographic section of population.

The disclosed information processing device may textually analyze a film script using Natural Language Processing (NLP) algorithms to identify characters, scenes, genre weightage of scenes, lead characters, and the like. This may provide an insight for production of the film at a script level. For functional data part, the past film data may be analyzed and each actor, director, region, season are scored for each genre. Also, each character in the film script may be mapped with an actor. The character mapping may be weighted with a score for each actor at different genres. Similarly, the director or other crew members may be mapped and given a weightage. The success-quotient may be obtained based on a weighted combined formula for the above-mentioned data. The information processing device may uniquely combine the insight of a film script with the functional data about actors, directors, season, genre, and social media weightage for actors and directors to provide a predictive success score from the film script itself. Also, the information processing device may predict the success-quotient for the film based on the historical film database (e.g., box-office data).

There are hundreds of film scripts which are received by various production houses and are typically analyzed manually. Reading each and every film script to find various aspects, such as mood of different scenes or the character involvement in each scene or which genre the scenes are distributed, has become difficult over time. The disclosed information processing device may provide insights of the film script in different aspects, such as a number of scenes, a number of characters, a polarity of each scene towards different genres, a combined insight with historical data of actors, and social buzz to provide a success-quotient or a score which gives an indication about a potential for success of the film. The success-quotient may factor in a chemistry between actors and/or directors to help production houses to select the film scripts which have a maximum chance of being successful.

The success-quotient may aid film production houses to take decision on content purchase, rights purchase, or a selection of a film script for a film production. Production houses may be able to select suited actors or crew for a film for a better success rate and may be more aware of possibility of a success of the film before producing the film or buying rights for the film. Production houses may be able to channelize funds in a more efficient manner on content which have a better likelihood of a success for the film.

FIG. 1 illustrates an exemplary environment for prediction of a film's success-quotient, in accordance with an embodiment of the disclosure. With reference to FIG. 1, there is shown a network environment 100. The network environment 100 may include an information processing device 102, a user device 104, a server 106, and a communication network 108. With reference to FIG. 1, there is further shown a Machine Learning (ML) model 110, which may be deployed, for example, as part of a software application on the information processing device 102.

The information processing device 102 may include suitable logic, control circuitry, and interfaces that may be configured to predict a success-quotient for a film based on a film script of the film. In at least one embodiment, the information processing device 102 may be implemented as a network of distributed cloud servers, which may function collectively to perform operations of the information processing device 102. Alternatively, the information processing device 102 may be a consumer-electronic device that may store instructions or program code to predict the success-quotient. Examples of the information processing device 102 may include, but are not limited to, a computer workstation, a mobile device, a tablet, a desktop computer, a laptop, a mainframe machine, a server, such as a cloud server, a group of servers, or any computing device or consumer-electronic device with text processing capability.

The user device 104 may include suitable logic, circuitry, and interfaces that may be configured to share the film script with the information processing device 102. In some instances, the user device 104 may provide a request to receive a predicted success-quotient for a film for production based on the shared film script. Examples of the user device 104 may include, but are not limited to, a mobile phone, a laptop, a tablet, a gaming device, a mainframe machine, a server, a computer workstation, and/or any other consumer electronic (CE) device.

The server 106 may include suitable logic, circuitry, and interfaces that may be configured to store a historical film database. In at least one embodiment, the server 106 may also store the ML model 110, which may be later used to predict a success-quotient for a film. The server 106 may be implemented as a cloud server which may execute operations through web applications, cloud applications, HTTP requests, repository operations, file transfer, and the like. Other examples of the server 106 may include, but are not limited to, a third-party server, a database server, a file server, a web server, a media server, an application server, a mainframe server, a cloud server, or other types of servers. In at least one embodiment, the server 106 may be implemented as a plurality of distributed cloud-based resources by use of several technologies that are well known to those skilled in the art. A person with ordinary skill in the art will understand that the scope of the disclosure may not be limited to implementation of the server 106 and the information processing device 102 as two separate entities. In certain embodiments, the functionalities of the server 106 may be incorporated in its entirety or at least partially in the information processing device 102, without a departure from the scope of the disclosure.

The communication network 108 may include a communication medium through which the information processing device 102, the user device 104, and the server 106 may communicate with each other. The communication network 108 may be a wired or wireless communication network. Examples of the communication network 108 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The Machine Learning (ML) model 110 may be a classifier model or a neural network model, which may be trained to identify a relationship between input datapoints and output labels. The ML model 110 may be trained on the input datapoints of the historical film database and may output a score for each input datapoint. The ML model 110 may be defined by its hyper-parameters, for example, activation function(s), number of weights, cost function, regularization function, input size, number of layers, and the like. The hyper-parameters of the ML model 110 may be tuned and weights may be updated so as to move towards a global minima of a cost function for the ML model 110. After several epochs of the training on the input datapoints, the ML model 110 may be trained to output a classification result for new unseen datapoints.

The ML model 110 may include electronic data, which may be implemented as, for example, a software component. The ML model 110 may rely on libraries, external scripts, or other logic/instructions for execution by a processing device, such as the information processing device 102. The ML model 110 may include code or routines to enable a computing device, such as the information processing device 102 to perform one or more operations to compute scores for different input datapoints, for example, scenes or cast for a film. Additionally, or alternatively, the ML model 110 may be implemented using hardware including a processor, a microprocessor (e.g., to perform or control performance of one or more operations), a field-programmable gate array (FPGA), or an application-specific integrated circuit (ASIC). Alternatively, in some embodiments, the ML model 110 may be implemented using a combination of hardware and software. Examples of the ML model 110 may include, but not limited to, artificial neural networks, deep neural networks, Bayesian models, support vector machines, and decision trees.

In operation, a film production house may receive a film script written by a screenplay writer. The film script may include, for example, a textual descriptions of scenes, scene locations, dialogues, character names, stage direction, character actions, and the like. The film production house may be interested to predict a success-quotient for a film that may be produced based on the film script. Herein, the success-quotient may include information (e.g., a number on a scale of 0 to 1) which may be indicative of a potential or likelihood of performance of the film at the box office.

The film script may be stored on the user device 104. The user device 104 may transmit the received film script to the information processing device 102, via the communication network 108. In some embodiments, the information processing device 102 may host a web application which may be accessible via a web client (for example, a web browser) of the user device 104. A user may upload the film script on the web application, via the web client of the user device 104.

The information processing device 102 may receive the film script from the user device 104. The film script may be associated with a film for production. The information processing device 102 may identify a plurality of scenes in the film script based on a textual analysis of the film script. For example, the textual analysis may include text mining operations, which may include an application of natural language processing (NLP) functions to scrape text of the film script and perform pre-processing operations, such as sentence/word tokenization, normalization operations (e.g., stemming and lemmatization to words), or filtering (e.g., stop word removal). The text mining operations may also include operations, such as vectorization, semantic context analysis, word clustering, Part-of-Speech (PoS) tagging, and/or other related operations.

The information processing device 102 may determine genre information of each scene of the identified plurality of scenes. The genre information may include, for example, a genre type of each scene of the identified plurality of scenes. The genre type may correspond to a particular type of film, a scene type, or tags related to other art forms. Common examples of the genre type may include, but are not limited to, action, adventure, animation, comedy, courtroom, crime, epic, erotica, fantasy, film noir, historical, horror, mystery, philosophical, political, religion, romance, saga, satire, science fiction, slice of life, spy, supernatural, thriller, urban, war, and biography. Additionally, or alternatively, in some embodiments, to determine a genre type for every identified scene, granular tags, such as plot types (e.g., comedy, tragedy, superhero, Adventure, etc.), dramatic situations (e.g., disaster, revolt, crimes of love, remorse, etc.), story types (e.g., action, animation, biography, comedy, crime, fantasy, etc.), and/or themes (e.g., redemption, resurrection, innocence, jealousy, sacrifice, etc.), may be derived from the film script.

For each scene of the identified plurality of scenes, the information processing device 102 may compute a first score based on the identified genre information of the plurality of scenes. The first score may be a genre wise weighted score for each scene and therefore, may be computer for every scene. For example, every scene in the film script may be associated with a context, an expected emotional-response, and a plot of the film and may include certain character(s) of the film script. Therefore, a first score for a scene of the film script may indicate an importance of the scene and as a potential success factor for the film.

The information processing device 102 may identify a list of characters in the film script further based on the textual analysis of the film script. Based on the historical film database, the information processing device 102 select an actor for a roleplay of each character in the identified list of plurality of characters. For example, the historical film database will include profiles of actors and associated roles/genres that may be most suitable for such actors based on their past acting skills, experiences, and/or successes with such roles/genres. Every actor in the historical film database may be assigned a score or an index between, for example, between 0 and 1, to indicate a suitability of the actor for different genres/film roles.

The information processing device 102 may compute a second score for every actor selected for the roleplay based on the ML model 110 that may be trained on datapoints of the historical film database. For example, the datapoints may include a rating of each actor of a list of actors and/or each crew member (such as a director) specified against different genres/roles. The information processing device 102 may be configured to determine the second score for each actor and/or each crew member based on the output of ML model 110. The method of computation of the second score is described in detail, for example in FIG. 4.

The information processing device 102 may calculate a success-quotient for the film based on the computed first score for each scene of the identified plurality of scenes and the computed second score for every actor selected for the roleplay. Details of the operation of the information processing device 102 are further provided in FIG. 3, FIG. 4, and FIG. 5, for example.

Figure 2:
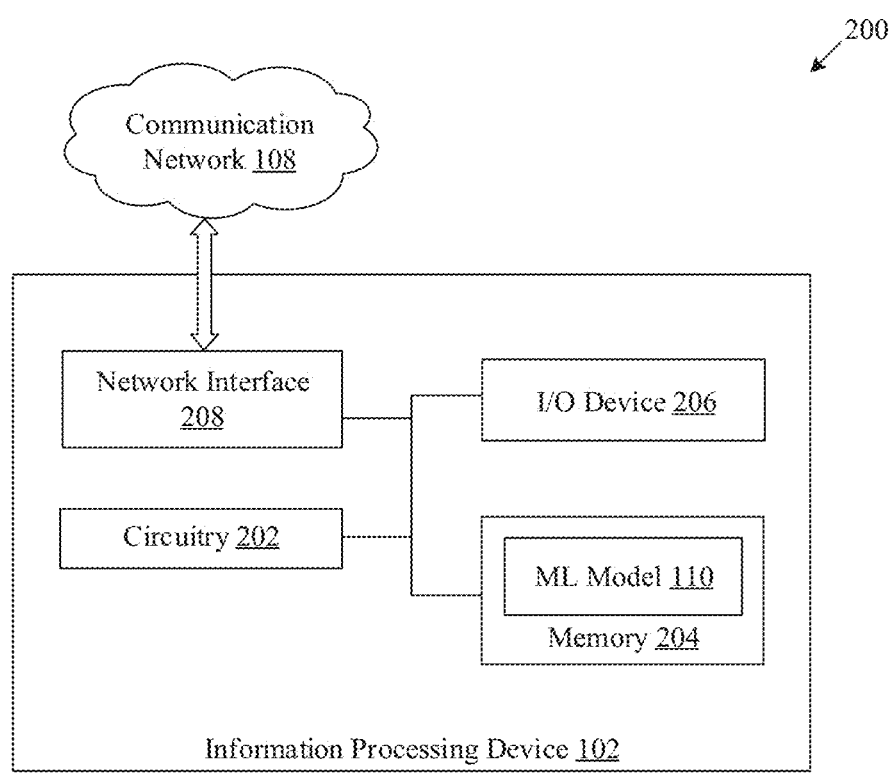
FIG. 2 is a block diagram that illustrates an exemplary information processing device for prediction of a film's success-quotient, in accordance with an embodiment of the disclosure.

FIG. 2 is a block diagram that illustrates an exemplary information processing device for prediction of a film's success-quotient, in accordance with an embodiment of the disclosure. FIG. 2 is explained in conjunction with elements from FIG. 1. With reference to FIG. 2, there is shown a block diagram 200 of the information processing device 102. The information processing device 102 may include circuitry 202 which may perform operations associated with the prediction of a film's success-quotient. The information processing device 102 may further include a memory 204, an input/output (I/O) device 206, and a network interface 208. The circuitry 202 may be communicatively coupled to the memory 204, the I/O device 206, and the network interface 208.

The circuitry 202 may include suitable logic, circuitry, and interfaces that may be configured to execute program instructions associated with different operations to be executed by the information processing device 102. For example, some of the operations may include identification of scenes and a list of characters in the film script, computation of scores for the scenes, selection of actors for roleplays of the list of characters, computation of scores for the selected actors, and prediction of a success-quotient for film based on computed scores for the scenes and selected actors. The circuitry 202 may include one or more specialized processing units. The one or more specialized processing units may be implemented as an integrated processor or a cluster of processors that collectively performs the functions of the one or more specialized processing units. The circuitry 202 may be implemented based on a number of processor technologies known in the art. Examples of implementations of the circuitry 202 may include, but are not limited to, an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a co-processor, a microcontroller, a central processing unit (CPU), and/or a combination thereof.

The memory 204 may include suitable logic, circuitry, and interfaces that may be configured to store the program instructions to be executed by the circuitry 202. Also, the memory 204 may be configured to store the film script, the ML model 110, intermediate results, or final predictions/results associated with the different operations executed by the circuitry 202. Examples of an implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and interfaces that may be configured to receive an input and provide an output based on the received input. The I/O device 206 which may include various input and output devices, may be configured to communicate with the circuitry 202. Examples of the I/O device 206 may include, but are not limited to, a touch screen, a keyboard, a mouse, a joystick, a microphone, a display device, and a speaker.

The network interface 208 may include suitable logic, circuitry, and interfaces that may be configured to facilitate communication among the circuitry 202, the user device 104, and the server 106, via the communication network 108. The network interface 208 may be implemented by use of various known technologies to support wired or wireless communication of the information processing device 102 with the communication network 108. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to facilitate the communication via wired or wireless communication networks, such as internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The functions or operations executed by the information processing device 102, as described in FIG. 1, may be performed by the circuitry 202. The operations executed by the circuitry 202 are described in detail, for example, in the FIGS. 3, 4, and 5.

Figure 3:
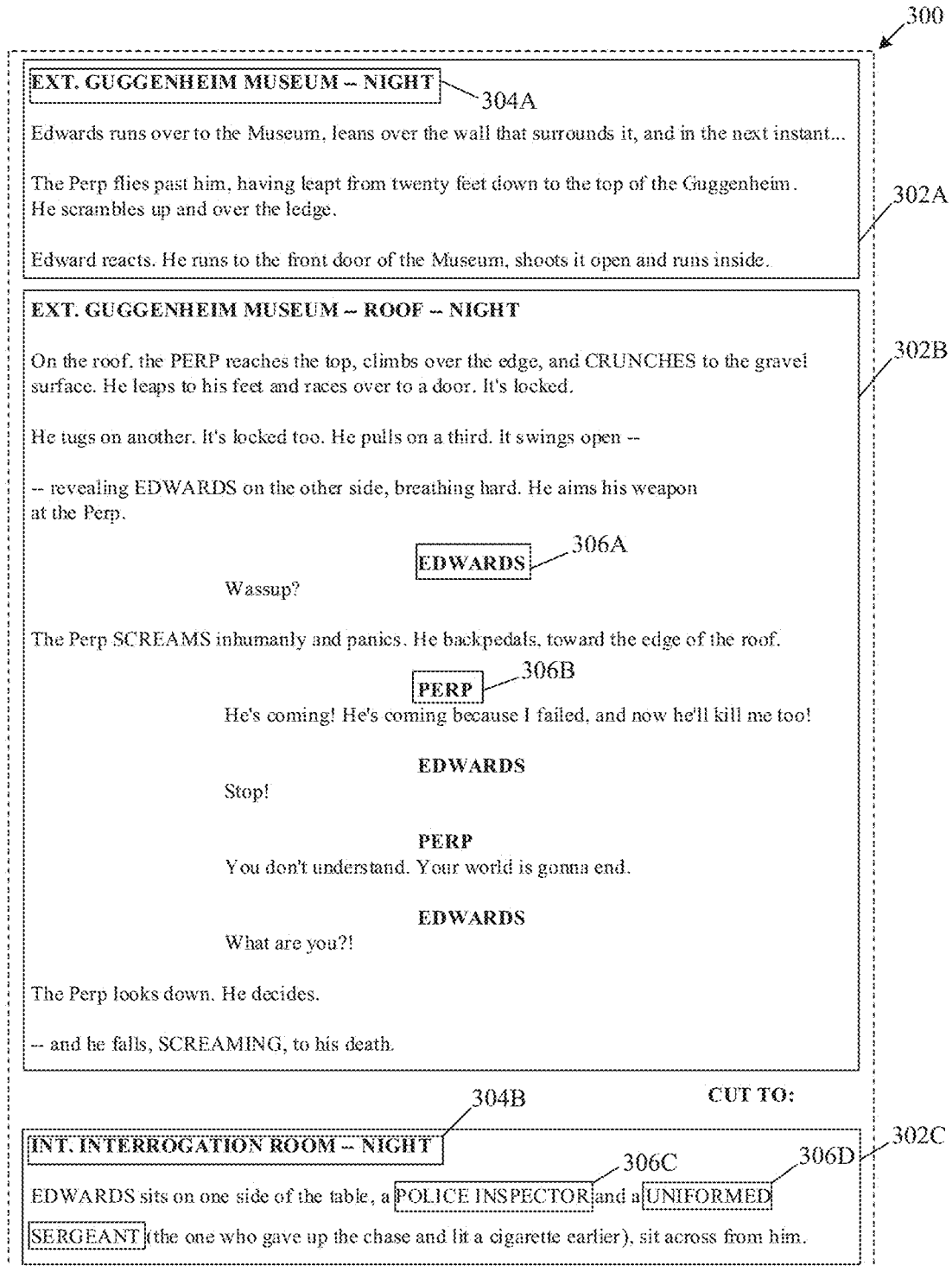
FIG. 3 is a diagram that illustrates a portion of a film script, in accordance with an embodiment of the disclosure.

FIG. 3 is a diagram that illustrates a portion of a film script, in accordance with an embodiment of the disclosure. FIG. 3 is explained in conjunction with elements from FIG. 1 and FIG. 2. With reference to FIG. 3, there is shown a page 300 of a film script based on which few scenes of a film can be produced. The page 300 contains dialogues and direction for one or more scenes of the film script. The film script may be a text-based document that outlines a story via aural, visual, behavioral, or lingual elements, typically required to describe scenes, characters, acts, or dialogues/conversations between characters in the story.

The film script may be written by a screenplay writer and may be received by the film production house from the screenplay writer. The film production house may be interested to predict a success-quotient for a film based on the film script. The success-quotient for the film may determine how the film, produced based on the film script, will perform at box office (e.g., in terms of film ratings or earnings) or a measure of its potential popularity within a particular group or a demographic section of population.

In order to perform a textual analysis of the film script, the information processing device 102 may implement one or more Natural Language Processing (NLP) methods, especially statistical NLP methods that rely on ML algorithms, to mine text in the film script and extract key features from the mined text. For example, some of the key features may include scenes, a list of characters, lead characters, scene locations, scene-wise genre, and the like.

As shown, the page 300 of the film script includes 3 scenes, i.e., a first scene 302A, a second scene 302B, and a third scene 302C. The first scene 302A starts with a scene heading 304A "EXT. GUGGENHEIM MUSEUM—NIGHT", where "EXT." may imply that the first scene 302A takes place in an exterior environment. "GUGGENHEIM MUSEUM" may be the location of the first scene 302A, and "NIGHT" may indicate a time of day of the first scene 302A. The second scene 302B may be same as the first scene 302A, with an exception that a scene spot ("ROOF" of the "GUGGENHEIM MUSEUM") is also mentioned. Similarly, in scene heading 304B of the third scene 302C, "INT." may correspond to indoor or interior environment. The third scene 302C may be supposed to be shot inside the interrogation room at some time in night.

By way of example, and not limitation, the information processing device 102 may identify the first scene 302A, the second scene 302B, and the third scene 302C on the page 300 of the film script. Such scenes may be identified based on screenwriting terms. For example, each scene may start with a scene heading that may correspond to a short description of the location and a time of day of the scene. Additionally, keywords, such as "CUT TO:", between the second scene 302B and the third scene 302C, may indicate that a new scene starts from a next sentence on the page 300. The information processing device 102 may rely on the scene headings, keywords (e.g., INT., EXT., CUT TO, etc.), or location markers to identify scenes, such as the first scene 302A, the second scene 302B, and the third scene 302C on the page 300 of the film script.

The information processing device 102 may further identify a list of characters in the film script. For example, in the first scene 302A, there is a first character 306A named "Edwards" and a second character 306B named "Perp". In some embodiments, the information processing device 102 may select sentences from a scene and apply a (Part-of-Speech) PoS tag to each word of the selected sentence. For example, in the first scene 302A, there are two sentences, "Edwards runs over to the Museum, leans over the wall that surrounds it, and in the next instant . . . " and "The Perp flies past him . . . ". Herein, "Edwards" and "Perp" may be assigned a PoS tag of "NNP", which may represent that both "Edwards" and "Perp" are proper nouns (singular). Also, a gender may be determined based on personal pronouns, such as "him/her" in other sentences of the first scene 302A.

Additionally, or alternatively, in some embodiments, each scene may be analyzed to identify different characters based on dialogues/conversations in the respective scene and associated sentence/paragraph structure. For example, every dialogue may initiate from a new line and start with a name of the character who may say the dialogue, followed by the dialogue.

The information processing device 102 may analyze the second scene 302B to identify that the characters in the second scene 302B are same as the first character 306A and the second character 306B. Similarly, the information processing device 102 may analyze the third scene 302C to identify two new characters, i.e. a third character 306C and a fourth character 306D. The third character 306C may be a "POLICE INSPECTOR" and the fourth character 306D may be "UNIFORMED SERGEANT". Similarly, the information processing device 102 may analyze all pages of the film script to identify a list of characters and a total number of characters for the film.

In some embodiments, the information processing device 102 may identify one or more lead characters from the identified list of characters. By way of example, the information processing device 102 may determine a frequency or a count by which a character's name or a character's dialogue occurs in every scene of the film script. A character may be identified as a lead character based on a determination that the character (or character's name) is present in almost all scenes (e.g., >80%) of the film script and may have a greater number of dialogues as compared to that of other characters in the film script.

Figure 4:
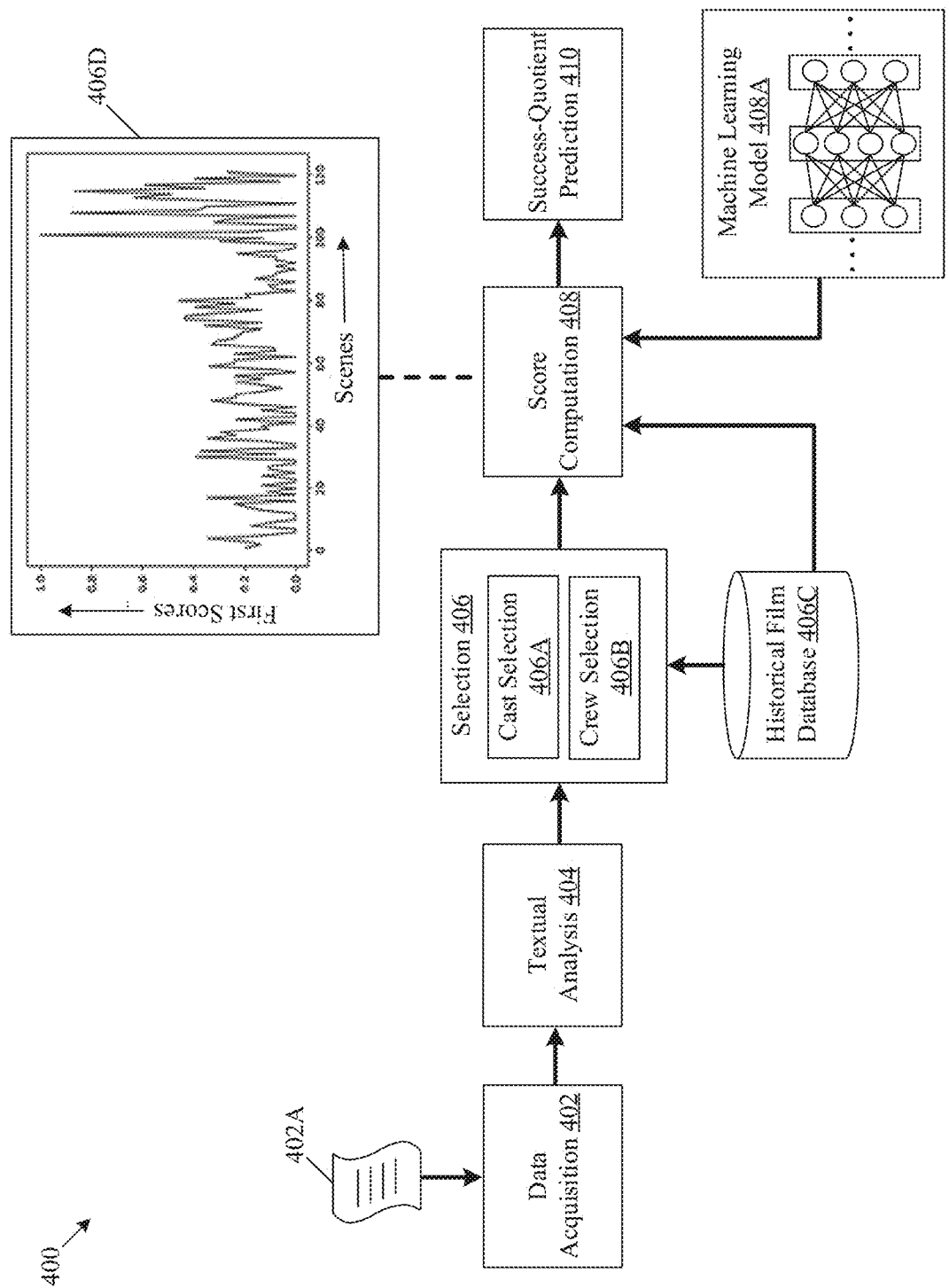
FIG. 4 is a diagram that illustrates exemplary operations for prediction of a film's success-quotient, in accordance with an embodiment of the disclosure.

FIG. 4 is a diagram that illustrates exemplary operations for prediction of a film's success-quotient, in accordance with an embodiment of the disclosure. FIG. 4 is explained in conjunction with elements from FIG. 1, FIG. 2, and FIG. 3. With reference to FIG. 4, there is shown a block diagram 400. The exemplary operations may be from 402 to 410 and may be performed by any computing system, for example, by the information processing device 102 of FIG. 2.

At 402, data acquisition may be performed. For data acquisition, the information processing device 102 may receive a film script 402A from a source (for example, the user device 104), via the communication network 108. In some embodiments, the film script 402A may be received from a web-based source, such as the server 106, via the communication network 108. The film script 402A may be a text-based document that outlines a story via aural, visual, behavioral, or lingual elements, typically required to describe scenes, characters, acts, or dialogues/conversations between characters in a story. The film script 402A may also include dialogues and direction for the film.

At 404, textual analysis may be performed. The information processing device 102 may perform the textual analysis of the film script 402A. By way of example, and not limitation, the information processing device 102 may implement one or more Natural Language Processing (NLP) methods, especially statistical NLP methods that rely on ML algorithms to mine text in the film script 402A and extract key features from the mined text. As also described in FIG. 3, based on the textual analysis of the film script 402A, the information processing device 102 may identify a plurality of scenes in the received film script 402A and a list of characters in the received film script 402A. In some embodiments, the information processing device 102 may further identify a distribution of the identified list of characters across the identified plurality of scenes. For example, the distribution may include a number and names of characters who appear in each individual scene of the film script 402A.

Additionally, or alternatively, the information processing device 102 may determine a depiction of a celebratory event or a seasonal event in one or more scenes of the identified plurality of scenes based on the textual analysis of the film script 402A. For example, one or more scenes may include celebratory events, such as a Christmas party or a Halloween party. Based on the determined depiction of the celebratory event or the seasonal event, the information processing device 102 may estimate a release date for the film (if produced based on the film script 402A). Other factors, such as number of scenes, scene locations, budget, or budget constraints may also be considered to estimate a release date for the film. Details of the other factors are omitted from the disclosure for the sake of the brevity.

Additionally, or alternatively, in some embodiments, the information processing device 102 may identify one or more lead characters in the identified list of characters based on the textual analysis of the film script 402A. For example, as also discussed in FIG. 3, a frequency or a count by which a character's name or a character's dialogue occurs in every scene of the film script 402A may be determined. The character may be identified as a lead character based on a determination that the character is present in more than a threshold number of scenes (e.g., >80%) of the film script 402A and may have a greater number of dialogues as compared to other characters (e.g., more than 80% characters) in the film script 402A.

Additionally, or alternatively, in some embodiments, the information processing device 102 may identify a set of production variables for the film based on the textual analysis of film script 402A. The set of production variables may include, for example, a number of scene locations, a number of scenes, a number of characters, and the like. Additionally, the information processing device 102 may determine a budget and a filming duration for the production of the film.

In some embodiment, the plurality of scenes, the list of characters, the distribution of the identified list of characters, the one or more lead characters, the number of scene locations, the number of characters, the number of scenes, the depiction of the celebratory event or the seasonal event, and the estimation of the release date, or the set of production variables may be scored and later used for the prediction of the success-quotient of the film.

At 406, a selection operation may be performed. For the selection operation, the information processing device 102 may select cast and crew members for the film to be produced based on the film script 402A. The selection operation may include a cast selection operation 406A and a crew selection operation 4068.

In at least one embodiment, before cast and crew members may be selected, a historical film database 406C may be retrieved, for example, from the server 106. The historical film database 406C may include information about actors, and crew members, such as directors and producers, and their respective roles in past films and their association with different genres. The historical film database 406C may also include an index for every actor and every crew member. The index for an actor may indicate a suitability of the actor for roles associated with particular genre types. For example, an index for actor "Bruce" may be given by Table 1, as follows:

TABLE 1

| Index for Bruce | | | |
|---|---|---|---|
| Actor: Bruce | 0.1 | 0.7 | 0.2 |
| Genre Types | Romantic | Action | Comedy |

Similarly, an index for a Director "John" may be given by Table 2, as follows:

TABLE 2

| Index for John | | | | |
|---|---|---|---|---|
| Director: John | 0.05 | 0.6 | 0.20 | 0.15 |
| Genre Types | Romantic | Action | Comedy | Drama |

In some embodiments, the historical film database 406C may also include information about scenes of past films, ratings of past films, high-points/low-points of past films, trending genres/events on social media platforms. Such scenes may also include scenes related to celebratory events and/or seasonal events. Additionally, in some instance, the historical film database 406C may also include a rating for each scene or a group of scenes of past films. The rating may be obtained from a plurality of viewers and may reflect an approval score or a popularity-measure of the scene. Additionally, or alternatively, in some instances, the historical film database 406C may also include previously computed success-quotients for the past films.

At 406A, a cast selection operation may be performed. For the cast selection operation, the information processing device 102 may select an actor for a roleplay of each character of the identified list of characters. The actor may be selected for the roleplay based on datapoints of the historical film database 406C. In some embodiments, the information processing device 102 may select a genre of the film script 402A from a plurality of genres specified in the historical film database 406C. Based on the selected genre, the historical film database 406C may be filtered to extract a list of actors for which the index is maximum for the selected genre. The extracted list of actors may be potential candidates for the roleplay of at least one character in the identified list of characters. For example, in Table 1, for Bruce, the index is maximum for "Action" genre and in case the film script 402A is also associated with the "Action" genre, then "Bruce" may be identified as a potential candidate for roleplay in the film.

At 406B, a crew selection operation may be performed. For the crew selection operation, the information processing device 102 may select a list of primary crew members for the film. The selection of the list of primary crew members may be based on the historical film database 406C. The primary crew members may include, for example, a director, a producer, a director of photography, a camera operator, a camera assistant, grips, gaffers, a boom operator, a production designer, a script supervisor, and the like.

In some embodiments, the historical film database 406C may be filtered to extract a list of members for which the index is maximum for the selected genre. The extracted list of members may be potential candidates for at least one role associated with a film crew in the production of the film. For example, in Table 2, for John, the index is maximum for "Action" genre and in case the film script 402A is also associated with the "Action" genre, then "John" may be identified as a potential candidate for the director of the film.

For example, for every role (includes acting roles and production roles (e.g., direction, art, cinematography, etc.) in the production of the film, the historical film database 406C may include a set of profiles of at least two or more actors or potential crew members. In order to narrow down to suitable profiles for a genre (such as, action), the information processing device 102 may apply a filter for the genre on the set of profiles to obtain a filtered set of profiles that are only relevant for the genre (such as, action).

At 408, a score computation operation may be performed. The information processing device 102 may compute scores based on various details identified based on the textual analysis of the film script 402A, as described herein. The computed scores may be then used by a unified scoring model (e.g., a mathematical scoring function) to predict the success-quotient for the film.

The information processing device 102 may compute a first score for each scene of the identified plurality of scenes. Herein, for each scene, the first score may be computed based on genre information for the respective scene of the identified plurality of scenes. Examples of the genre information may include, but are not limited to, surreal, whimsical, action, adventure, comedy, crime, drama, fantasy, historical, historical fiction, horror, magical, mystery, paranoia, fiction, philosophical, political, romance, saga, satire, science fiction, social, speculative, thriller, urban, and western. At first, the information processing device 102 may determine the genre information for each scene and may then compute the first score for each scene of the identified plurality of scenes based on the determined genre information. Shown as an example, a normalized scene-wise score graph 406D is shown to include first scores between 0 and 1 for 120 scenes of an example film script. Herein, peaks in the normalized scene-wise score graph 406D may indicate prominent scenes of film script and may carry a higher weight in the prediction of the success-quotient for the film. Similarly, scenes for which first scores are 0 or about 0 may carry low weight or no weight in the prediction of the success quotient for the film.

Additionally, or alternatively, the information processing device 102 may identify a distribution of the identified set of characters (as also mentioned at 404) across the identified plurality of scenes based on the textual analysis of the film script 402A. The first score for each scene of the identified plurality of scenes may be computed further based on the identified distribution of the set of characters. For example, if the genre of a scene is determined as 'action' and all lead characters are a part of the scene, a high score may be computed for that scene in comparison to another scene of the same genre but with side characters (i.e. characters who are not lead characters of the film).

The information processing device 102 may compute a second score for actor(s) selected (e.g., selected at 406A) for the roleplay of the identified list of characters in the film script 402A. The computed second score may be computed based on a ML model 408A and may indicate a suitability of the selected actor(s) for the roleplay. The ML model 408A may be trained on datapoints of the historical film database 406C. For example, if the ML model 408A is trained on actor names or actor IDs and associated index values (as a measure of suitability for roleplay) as output labels for particular film genres, then output labels for the selected actor (e.g., selected at 406A) may be the second score for the selected actor. The ML model 408A may be same as the ML model 110 of FIG. 1. An exemplary implementation of the ML model 408A is described in detail, for example, in FIG. 5.

Additionally, or alternatively, the information processing device 102 may determine a depiction of the celebratory event or the seasonal event in one or more scenes of the identified plurality of scenes (as also described at 404). The information processing device 102 may compute a third score for the determined depiction of the celebratory event or the seasonal event in one or more scenes of the identified plurality of scenes. As an example, an impact of such scenes in past films may be measured based on the historical film database 406C to compute the third score. As scenes based on the celebratory event or the seasonal event may be considered as impactful or engaging for viewers, the computed third score for such scenes may be considered in evaluation of a success-quotient for the film.

Additionally, or alternatively, the information processing device 102 may compute a fourth score for the estimated release date for the film to be produced. The release date of the film may be estimated based on the determined depiction of the celebratory event or the seasonal event. For example, if there are multiple scenes in the film script 402A that are based on the celebration of Christmas, the release date may be set on a day that is near to or same as Christmas day or the day of the new year. There may be other factors to estimate the release date, for example, budget, production schedule, cast availability, scene locations, social media trends, festivals, and seasonal trends. In certain situations, if the estimate date falls on a weekend, the fourth score may be computed as a higher score as compared to situations where the estimated date falls on a weekday.

Additionally, or alternatively, the information processing device 102 may compute a fifth score for each primary crew member in the list of primary crew members. The list of primary crew members may be selected by the information processing device 102 at 406B. The fifth score may indicate a suitability of a corresponding primary crew member for a job in the production of the film and may be computed based on the ML model 408A. For example, referring to Table 2, a high score for John may indicate his suitability as a director for the film.

At 410, a success-quotient may be predicted for the film. The information processing device 102 may predict the success-quotient for the film based on the computed first score for each scene of the identified plurality of scenes and the computed second score for the selected actor(s) for the identified list of characters in the film script 402A. Additionally, or alternatively, the success-quotient for the film may be predicted further based on the computed third score for the depiction of the celebratory event or the seasonal event in one or more scenes of the film script 402A, the computed fourth score for the estimated release date, or the computed fifth score for each primary crew member in the list of primary crew members.

The success-quotient may be a prediction of a performance of the film at the box-office. The performance may be an indicator for variables, such as an audience approval or a popularity rating, a financial gain (e.g., in terms of profit/loss with respect to a production budget for the film), a film rating, and the like. For example, in some instances, if the value of the predicted success-quotient is greater than a threshold value (e.g., 0.75 or 75%), the film script 402A may be recommended to user(s) associated with the film production house.

In some embodiments, the information processing device 102 may identify a set of production variables based on the textual analysis of the film script 402A. The set of production variables may include, for example, a number of scenes, a number of characters, or a number of scene locations in the film script 402A. Additionally, from other data sources, such as budget or budget-related constraints and a filming duration or schedule for the production may be determined. The information processing device 102 may compute a first weight for the identified set of production variables, a second weight for the determined filming duration, and a third weight for the determined budget. The first weight, the second weight, and the third weight may be determined based on the historical film database 406C or based on the ML model 408A.

In some other embodiments, the information processing device 102 may estimate a popularity-measure of a context or a genre of at least one scene of the film script 402A based on analysis of the social media activities of users and past activities of users for past films. The information processing device 102 may predict the success-quotient for the film further based on the estimated popularity-measure. For example, at least 50 scenes in a film script 402A have a context of presidential elections. Based on social media trends (e.g., posts, comments, or other user activities), the popularity-measure for presidential elections may be estimated to be high (e.g., top 10 trending internet topics in USA) or on televised media platforms and the presidential elections may be considered as a relevant factor in the prediction of the success-quotient for the film.

In at least one embodiment, the information processing device 102 may apply a unified scoring model on the computed first score, the computed second score, the computed third score, the computed fourth score, the computed fifth score, the first weight, the second weight, the third weight, and the estimated popularity-measure. For example, the unified scoring model may include a summation function and a sigmoid function. While the summation function may output a sum (e.g., a weighted sum) of the computed scores, the weights, and the popularity-measure, the sigmoid function may output a success-quotient (e.g., between 0 and 1) as a prediction for the film based on the output sum. It should be noted that the summation function and the sigmoid function are merely provided as an example for the unified scoring model. The present disclosure may be also applicable to other mathematical functions or models (such as Deep Neural Networks), without a deviation from the scope of the disclosure.

By way of example, and not limitation, the information processing device 102 may predict the success-quotient based on equation (1), which is provided as follows:

$$\text{Success-Quotient} = w1 \times \left(\sum_{g=1}^{m} a_g\right) \Big/ m + \sum_{p=1}^{n} w_p(b_p) \quad (1)$$

where,
w1=weightage for the scene-wise genre score for the film script 402A,
$w_p$=weightage for each functional parameter, such actor score, director score, seasonality, budget, and the like,
m=number of scenes in the film script 402A,
$a_g$=scene score for the genre g,
$b_p$=score for the functional parameter p, for e.g. the selected actor score of director score, seasonality, budget, and the like, and
n=total number of functional parameters.
The weights may be dynamically calculated for each new film script by the information processing device 102. In some instances, the user may be provided with options to modify weight parameters according to the need of the user.

In accordance with an embodiment, the information processing device 102 may compare the predicted success-quotient with a threshold value. In case the predicted success-quotient is greater than the threshold value, the information processing device 102 may recommend the selected list of primary crew members as a production crew for the film. Additionally, or alternatively, the information processing device 102 may recommend the selected actor(s) as cast member(s) for the film based on a determination that the predicted success-quotient is greater than the threshold value. The cast member(s) may be suitable for the roleplay in the film to be produced based on the received film script 402A. In certain situations, the information processing device 102 may select a different actor from the historical film database 406C for the roleplay of each character in the identified list of characters based on a determination that the predicted success-quotient is below a threshold value. Based on the selection of the different actor(s), the information processing device 102 may iteratively perform the operations from 406 to 410 to again predict the success-quotient for the film. The selection of actor(s) and crew member(s) may be performed iteratively as a simulation until the predicted success-quotient is above the threshold value. Once the predicted success-quotient is above the threshold value, an optimal list of cast members and crew members may be obtained for the film.

Figure 5:
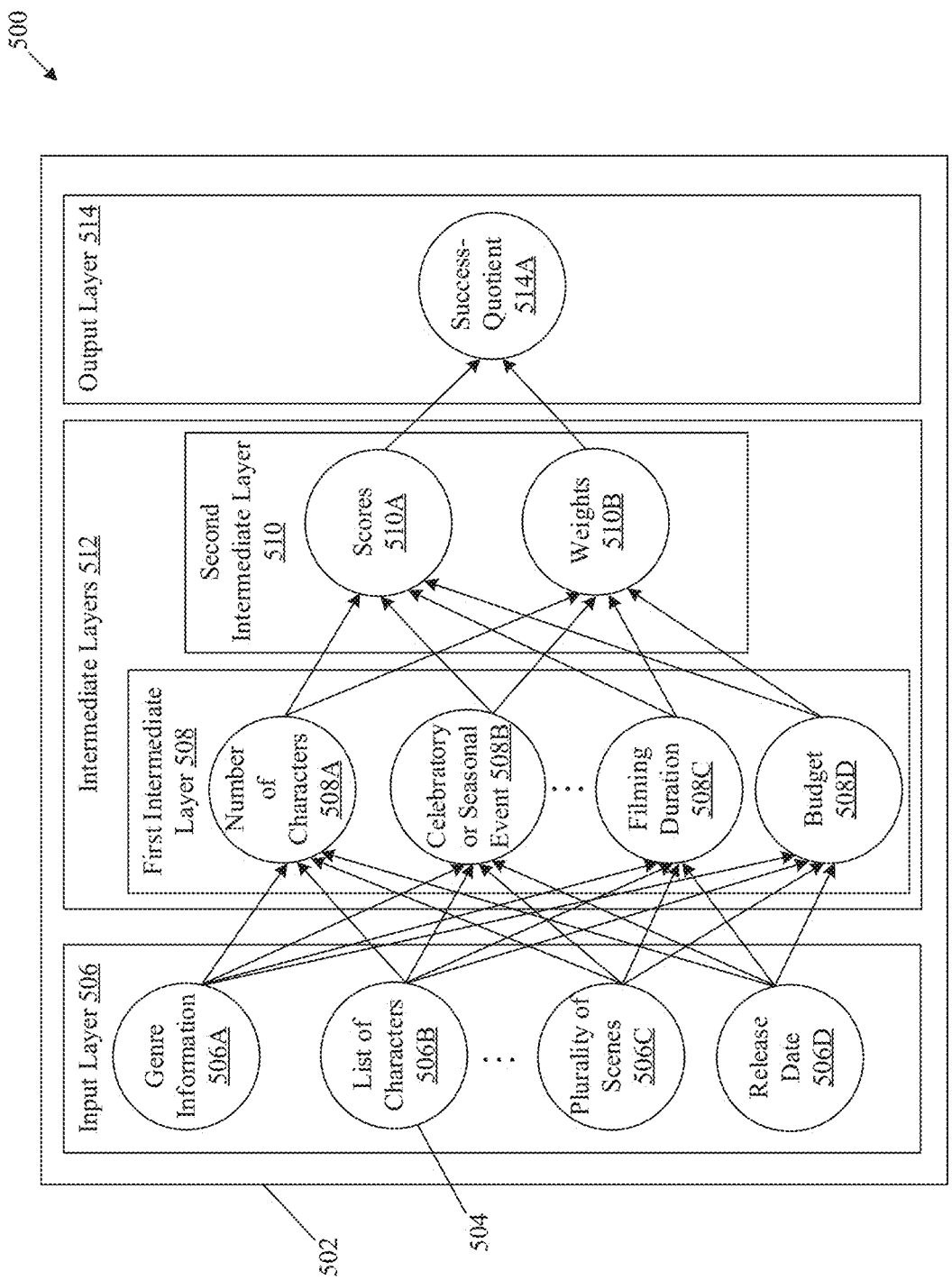
FIG. 5 is a diagram that illustrates an exemplary machine learning (ML) model for prediction of a film's success-quotient, in accordance with an embodiment of the disclosure.

FIG. 5 is a diagram that illustrates an exemplary machine learning (ML) model for prediction of a film's success-quotient, in accordance with an embodiment of the disclosure. FIG. 5 is explained in conjunction with elements from FIG. 1, FIG. 2, FIG. 3, and FIG. 4. With reference to FIG. 5, there is shown a diagram 500 of a Deep Neural Network (DNN) 502 as an exemplary implementation of the ML model 110 of FIG. 1 or the ML model 408A of FIG. 4. It should be noted that the DNN 502 (especially, in terms of a number of layers and a number of nodes) is merely provided as an example and should not be construed as limiting for the disclosure. The present disclosure may also be applicable to other variations (e.g., in number of nodes/layers) of the DNN, without a deviation from the scope of the disclosure.

The DNN 502 may be referred to as a computational neural network or a system of artificial neurons, where each layer of the DNN 502 may include artificial neurons as nodes 504. The DNN 502 may contain a plurality of layers, such as an input layer 506, one or more hidden layers (a first intermediate layer 508 and a second intermediate layer 510, collectively referred to as intermediate layers 512), and an output layer 514.

The input layer 506 may include a first node 506A, a second node 506B, a third node 506C and a fourth node 506D. The first node 506A of the input layer 506 may be associated with the genre information, the second node 506B of the input layer 506 may be associated with the identified list of characters, the third node 506C of the input layer 506 may be associated with the identified plurality of scenes, and the fourth node 506D of the input layer 506 may be associated with the estimated release date of the film.

The first intermediate layer 508 may include a first node 508A, a second node 508B, a third node 508C, and a fourth node 508D. The first node 508A of the first intermediate layer 508 may be associated with a number of characters in the film script, the second node 508B of the first intermediate layer 508 may be associated with a depiction of celebratory or seasonal events in the film script, the third node 508C of the first intermediate layer 508 may be associated with a filming duration of the film, and the fourth node 508D of the first intermediate layer 508 may be associated with a budget of the film. Similarly, the second intermediate layer 510 may include a first node 510A and a second node 5108. The first node 510A of the second intermediate layer 510 may be associated with scores (e.g., the first score, the second score, or other scores, as also computed at 408 of FIG. 4). The second node 5108 of the second intermediate layer 510 may be associated with weights (e.g., the first weight, the second weight, and the third weight as also computed at 410). The output layer 514 may include an output node 514A that may output the success-quotient for the film as a predicted value, e.g. between 0 and 1, based on the scores associated with the first node 510A and the weights associated with the second node 5108.

Outputs of all the nodes 504 in the DNN 502 may be coupled to at least one node of preceding or succeeding layer(s) of the DNN 502. Similarly, inputs of all the nodes 504 in the DNN 502 may be coupled to at least one node of preceding or succeeding layer(s) of the DNN 502. Node(s) in the output layer 514 of the DNN 502 may receive inputs from at least one previous layer. A number of layers and a number of nodes 504 in each layer may be determined from a network topology and certain hyper-parameters of the DNN 502. Such hyper-parameters may be set before or while training the DNN 502 on a training dataset constructed based on the datapoints of the historical film database.

Each node in the DNN 502 may correspond to a mathematical function with a set of parameters, tunable while the DNN 502 is trained. These parameters may include, for example, a weight parameter, a regularization parameter, and the like. Each node may use the mathematical function to compute an output based on one or more inputs from nodes in other layer(s) (e.g., previous layer(s)) of the DNN 502. In FIG. 1, a simplified example of the DNN 502 is presented. Other examples of the DNN 502 may include, but are not limited to, a recurrent neural network (RNN), a Convolutional Neural Network (CNN)-Recurrent Neural Network (CNN-RNN), an artificial neural network (ANN), a Long Short Term Memory (LSTM) network, CNN+ANN, LSTM+ANN, a Gated Recurrent Unit (GRU)-based RNN, a Fully Connected Network, a Connectionist Temporal Classification (CTC)-based RNN, and/or a combination of such networks. In certain embodiments, the DNN 502 may be based on a hybrid architecture of multiple DNNs.

The DNN 502 may include electronic data, which may be implemented as, for example, a software component of a software program. The DNN 502 may rely on libraries, external scripts, or other logic/instructions for execution by a processing device, such as the information processing device 102. Additionally, or alternatively, the DNN 502 may be implemented using hardware, such as a processor, a microprocessor (e.g., to perform or control performance of one or more operations), a field-programmable gate array (FPGA), or an application-specific integrated circuit (ASIC). In some embodiments, the DNN 502 may be implemented using a combination of both the hardware and a software program.

The information processing device 102 may input a dataset to the input layer 506 of the DNN 502. More specifically, the dataset may be provided as an input to the first node 506A, the second node 506B, the third node 506C, and the fourth node 506D of the input layer 506. The dataset may include, for example, the genre information associated with the plurality of scenes of the film script, the identified list of characters of the film script, the identified plurality of scenes of the film script, and the release date for the film. The output of the input layer 506 may be provided as a weighted input to the first intermediate layer 508. Based on the weighted input from the input layer 506, the first node 508A, the second node 508B, a third node 508C, and the fourth node 508D of the first intermediate layer 508 may identify a number of characters in the film script, identify scenes associated with celebratory events or seasonal events, estimate a filming duration for the film, and a budget for the film, respectively.

The first node 510A of the second intermediate layer 510 may compute scores, such as a first score for each scene of the identified plurality of scenes and a second score for the actor(s) selected for the roleplay of the identified list of characters in the film script. Additionally, or alternatively, in some embodiments, other nodes (not shown) of the second intermediate layers 510 may compute a third score for the depiction of celebratory or seasonal events in scenes of the film script, a fourth score for the estimated release date, and a fifth score for each primary crew member in the list of primary crew members. The second node 510B of the second intermediate layer 510 of the DNN 502 may compute weights, such as a first weight for the set of production variables, a second weight for the filming duration for the film, a third weight for the budget of the film.

The output node 514A of the output layer 514 may receive computed scores (first, second, third, fourth, or fifth scores) and/or weights (first, second, or third weights) as input. The output node 514A of the output layer 514 may include an activation function/scoring function to compute the success-quotient as a prediction for the film script. By way of example, and not limitation, the output node 514A may calculate a weighted average of the computed scores and the computed weights to output the success-quotient for the film. By way of example, and not limitation, the output node 514A of the output layer 514 of the DNN 502 may apply a sigmoid activation on the computed scores and/or the weights to output the success-quotient for the film.

It should be noted that the weighted average or the sigmoid activation is merely provided as an example, the present disclosure may be also applicable to other scoring functions to predict the success-quotient, without a deviation from the scope of the disclosure.

Figure 6:
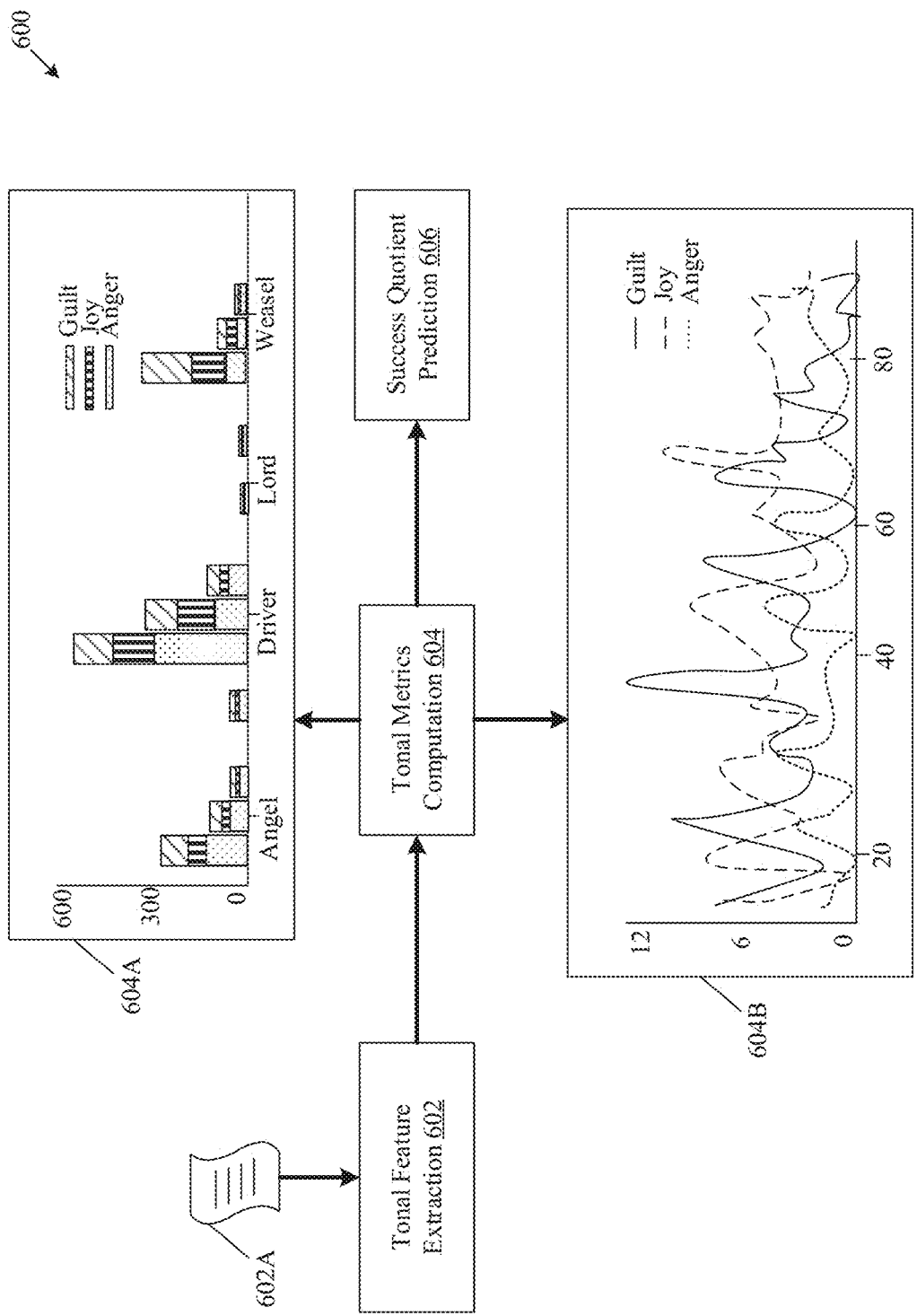
FIG. 6 is a diagram that illustrates exemplary operations for prediction of a film's success-quotient based on tonal metrics, in accordance with an embodiment of the disclosure.

FIG. 6 is a diagram that illustrates exemplary operations for prediction of a film's success-quotient based on tonal metrics, in accordance with an embodiment of the disclosure. FIG. 6 is explained in conjunction with elements from FIG. 1, FIG. 2, FIG. 3 FIG. 4, and FIG. 5. With reference to FIG. 6, there is shown a block diagram 600. The exemplary operations may be from 602 to 606 and may be performed by any computing system, such as by the information processing device 102 of FIG. 2.

At 602, a set of tonal features may be extracted from a film script 602A. In one embodiment, the information processing device 102 may extract the set of tonal based on the textual analysis of the film script 602A. The set of tonal features may describe a way in which dialogues may be delivered during a production stage of the film. The extracted set of tonal features may correspond to one or more of a narration or a state of a character, a text capitalization, an exclamation, a rhythm, a cadence, or an inflection in the film script 602A. With respect to the film script 602A which is a text representation of a film's storyline, choice of words, affinity, repetitiveness, wordplay and its context may define tonality or tonal features. Whereas, in an actual film, actors' face expression, body language, voice modulation, dialogue delivery, and inflection may contribute together to an overall meaning in life in the film. Subtle differences in tone can have a dramatic impact on how viewers perceive a scene in the film. For example, a comedy character should remain intact to similar tonality barring slight changes. Too much fluctuations and sway in tonality might put audience off and may impact movie success.

Typically, tonal features may be determined at the stage of movie production where actors are playing the characters of a film script. But the film script also contains nuances to actually identify tonal features. Narratives in the film script may help define how the dialogue is delivered by a character. As one example of narration, a portion of the film script 602A is provided, as follows:

BURT: That girl in the white dress always looks at me when I drive down on my bike.
JENNY: That's because you stare at her like a bloody stalker.
Just then Vicky comes plops noisily next to them.
He's suppressing a grin. Both of them look at him suspiciously.

In the portion, the narration "He's suppressing a grin. Both of them look at him suspiciously" may be analyzed to extract a state of the character "Vicky" before a dialogue is presented. As another example of narration, the film script 602A may include a text portion as "The actor's delivery punches a triple 'g' sound in the original dialogue—a humorous bit of alliteration that is replicated". This text portion may be analyzed to extract a state of the character before the dialogue. The body language may also be extracted from the text portion. As another example, the film script 602A may include the following text portion:

"INHI: Old lady, what do you care WHAT I do?
HAG: Oh, and what do YOU care what I care?"

Based on the textual analysis of the text portion of the film script 602A, the information processing device 102 may extract a first set of tonality features comprising a capitalized text ("WHAT", "YOU"), an exclamation, a rhythm, a cadence, or inflection.

At 604, a plurality of tonal metrics may be computed. The plurality of tonal metrics may include a first tonal metric, a second tonal metric, and a third tonal metric. The information processing device 102 may identify a plurality of scenes of the film script 602A and compute a first tonal metric for each scene of the identified plurality of scenes based on the extracted set of tonality features. An example of the computer tonal metric for about 100 scenes is provided in a first graph 604A. In the first graph 604A, each curve depicts a variation in a particular tonal level (one of guilt, joy, sadness, shame, disgust, anger, and fear) for about 100 scenes of the film script 602A. For each scene, one of the tonal levels may be dominant as indicated by a peak of a curve associated with a respective tonal level.

The information processing device 102 may identify a list of characters in the film script 602A and compute a second tonal metric for a first character of the identified list of characters. For the first character, the second tonal metric may depict a variation in the tonal levels associated with a role of the first character throughout the identified plurality of scenes of the film script 602A. These tonal levels may include one or more of guilt, joy, sadness, shame, disgust, anger, and fear. An example of the computed second tonal metric for four characters "Angel", "Driver", "Lord", and "Weasel" is displayed in a second graph 604B. The second graph 604B may depict the variation in the tonal levels, such as guilt, joy, sadness, shame, disgust, anger, and fear, for each of the four characters.

The information processing device 102 may further compute a third tonal metric corresponding to a variation of the tonal levels of the film script 602A. The third tonal metric may be for the entire length of the film script 602A and may determine a tonality of all dialogues in the film script 602A.

At 606, the success-quotient may be predicted for a film which may have to be produced based on the film script 602A. The success-quotient may be predicted based on the computed first tonal metric, the computed second tonal metric, or the computer third tonal metric. For example, each of the computed first tonal metric, the computed second tonal metric, or the computer third tonal metric may be normalized and passed to a sigmoid function to obtain a normalized tonal score. The normalized tonal scores may be combined with rest of the scores and weights for various functional parameters (as described in FIG. 4 and FIG. 5) to predict the success-quotient.

In some embodiments, the success-quotient for the film may be predicted based on a combination of the first tonal metric, the second tonal metric, and the third tonal metric with one or more of the first score (i.e. scene-wise genre score, as described in FIG. 4), the second score (character/cast score, as described in FIG. 4), the third score (for depiction of a celebratory event or a seasonal event in scenes, as described in FIG. 4), the fourth score (for estimated release date), and the fifth score (suitability of a corresponding primary crew member for a job in the production of the film).

Figure 7:
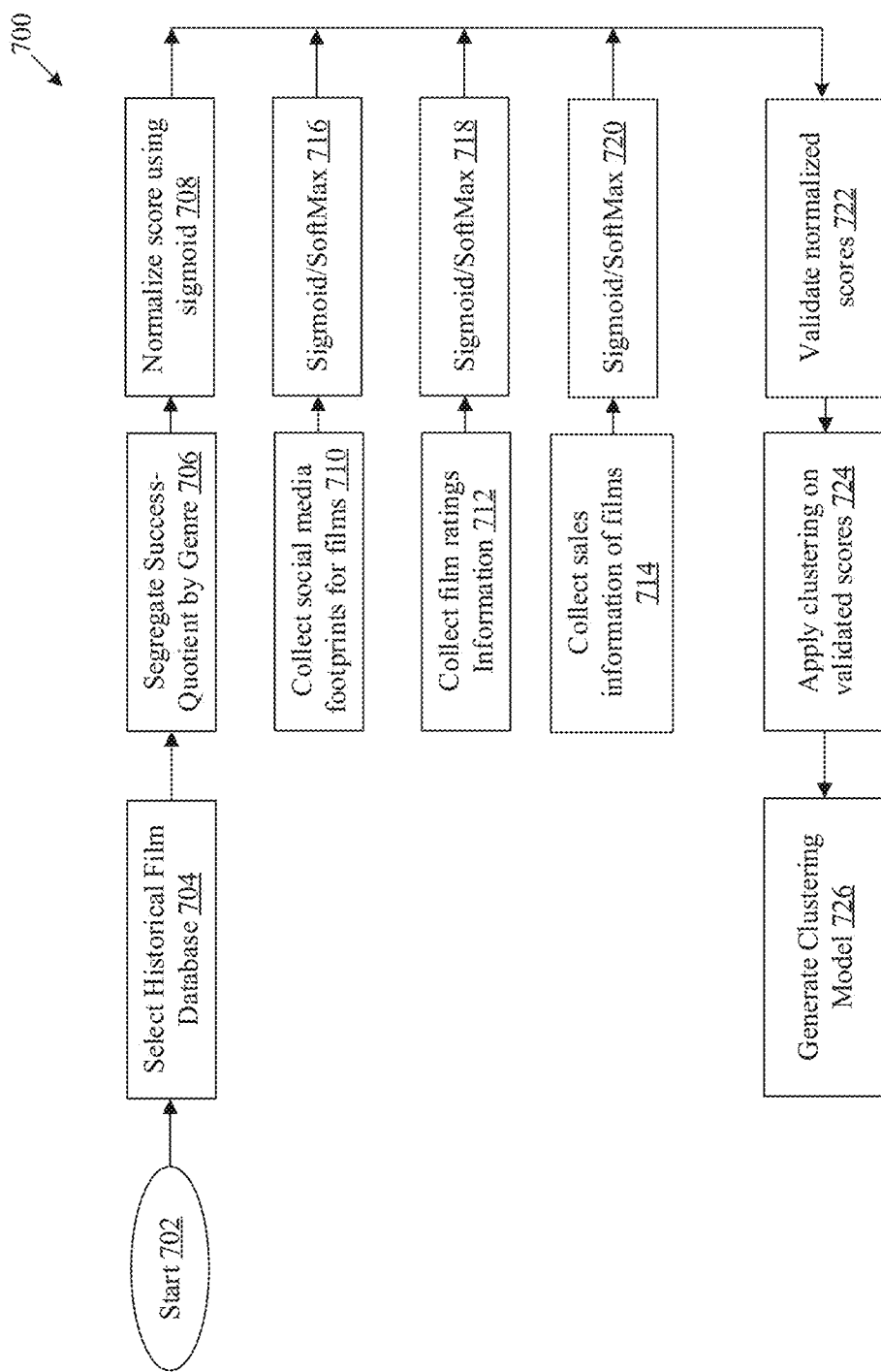
FIG. 7 is a block diagram that illustrates exemplary operations for generation of industry-wide baseline model for comparison of two or more versions of a film script, in accordance with an embodiment of the disclosure.

FIG. 7 is a block diagram that illustrates exemplary operations for generation of industry-wide baseline model for comparison of two or more versions of a film script, in accordance with an embodiment of the disclosure. FIG. 7 is explained in conjunction with elements from FIGS. 1, 2, 3, 4, 5, and 6. With reference to FIG. 7, there is shown a block diagram 700. The operations from 702 to 726 may be implemented on the information processing device 102. The operations may start at 702 and proceed to 704.

At 704, the historical film database (such as the historical film database 406C) may be retrieved and selected. Thereafter, scoring information from the historical film database may be extracted. The extracted scoring information may include a success-quotient for each past film of a plurality of past films. In some embodiments, the scoring information may include a score corresponding to each of a plurality of genres associated with a particular film.

At 706, a first set of genre-wise scores for each past film of the plurality of past films may be determined based on the respective success-quotient in the extracted scoring information. The first set of genre-wise score may be scores of the film's multiple genres. For example, the first set of genre-wise scores for four past films "Alpha", "Beta", "Gamma", and "Theta" are provided in Table 3, as follows:

TABLE 3

First set of genre-wise scores of past films

| Film | Comedy Score | Action Score | Thriller Score | Drama Score | Sci-Fi Score |
|---|---|---|---|---|---|
| Alpha | 65 | 45 | 36 | 74 | 32 |
| Beta | 55 | 68 | 75 | 85 | 56 |
| Gamma | 14 | 25 | 57 | 79 | 88 |
| Theta | 78 | 32 | 48 | 65 | 47 |

At 708, the determined first set of genre-wise scores may be normalized for each of the plurality of past films to generate a set of normalized scores. For example, a sigmoid function may be applied on the determined first set of genre-wise scores to generate the set of normalized scores. Each of the generated set of normalized scores may lie between 0 and 1.

At 710, statistical information comprising social media footprints may be collected for each of the plurality of past films. Examples of the social media footprints may include, but are not limited to, a number of likes or comments on posts associated with a past film, a sentiment or an emotional valence (e.g., through an emoticon or comments), a number of reposts, or a number of shares of posts associated with the past film.

At 712, statistical information comprising rating information may be collected for each of the plurality of past films. For example, the rating information may include a rating/score between 1 to 10, with 1 being the lowest score and 10 being the highest score. The rating may be calculated based on user votes (which may include critic votes as well).

At 714, statistical information comprising sales information may be collected for each of the plurality of past films. For example, the sales information may include total box office collection for the film, gross revenue, or a gross film profit.

At 716, a score value for the collected social media footprints may be computed. In some embodiments, the score value may be computed by the application of a sigmoid function on values included in the social media footprints. In some other embodiments, the score values may be computed by application of the SoftMax function on values included in the collected social media footprints.

At 718, a score value for the collected rating information may be computed. In some embodiments, the score value may be computed by the application of a sigmoid function on values included in the rating information. In some other embodiments, the score values may be computed by application of the SoftMax function on values included in the collected rating information.

At 720, a score value for the collected sales information may be computed. In some embodiments, the score value may be computed by the application of a sigmoid function on values included in the collected sales information. In some other embodiments, the score values may be computed by application of the SoftMax function on values included in the collected sales information.

At 722, the normalized first set of genre-wise scores for each past film of the plurality of past films may be validated. For each past film, such validation may be based on the computed score value for the collected social media footprints at 716, the computed score value for the rating information at 718, and the computer score for the sales information at 720.

At 724, a distance-based clustering method may be applied on the validated set of genre-wise scores for each past film of the plurality of past films. Examples of the distance based clustering method may include, but are not limited to, K-means, Facility Location with Outliers (FLO), Density-based spatial clustering of applications with noise (DBSCAN), Ordering points to identify the clustering structure (OPTICS), Mean-shift, Distribution-Based Clustering of Large Spatial Databases (DBCLASD), Gaussian Mixture Models Clustering (GMM), Balanced Iterative Reducing and Clustering using Hierarchies (BIRCH), Clustering Using Representatives (CURE), Robust Clustering using Links (ROCK), Fuzzy c-means (FCM), Fuzzy Compactness and Separation (FCS), or Mini-Model Clustering (MM).

At 726, a clustering model may be generated based on based on the application of the distance-based clustering method. The generated clustering model may be considered as an industry-wide baseline model for films and may include the plurality of past films as a plurality of datapoint clusters. The datapoint clusters may be clustered around a corresponding plurality of cluster centroids.

In an embodiment a second set of genre-wise scores for the film script 602A may be determined. The second set of genre-wise scores for the film script 602A may be determined based on the predicted success-quotient for the film script 602A. It may be determined whether the film script corresponds to a datapoint in a first datapoint cluster of the generated clustering model or corresponds to an outlier datapoint. The determination may be based on the determined second set of genre-wise scores. Thereafter, a comparison metric for the film script 602A may be generated based on a determination that the film script corresponds to one of a datapoint in the first datapoint cluster of the generated clustering model or corresponds to an outlier datapoint. For example, the comparison metric may be a distance value (e.g., Euler distance) for the film script 602A and may indicate a nearest datapoint point cluster of the generated clustering model to which the film script 602A may belong to.

In cases where there are two or more versions of the film script 602A, the clustering model may be utilized to determine a distance between the two or more versions of the film script 602A. Such distance may predict a likely difference between genre-wise scores for two version of a future film which may be based on the two versions of the film script 602A. As datapoints of the clustering model, if the distance between the two versions of the film script 602A is above than a threshold, then a notification indicative of such distance may be generated on the information processing device 102.

Figure 8:
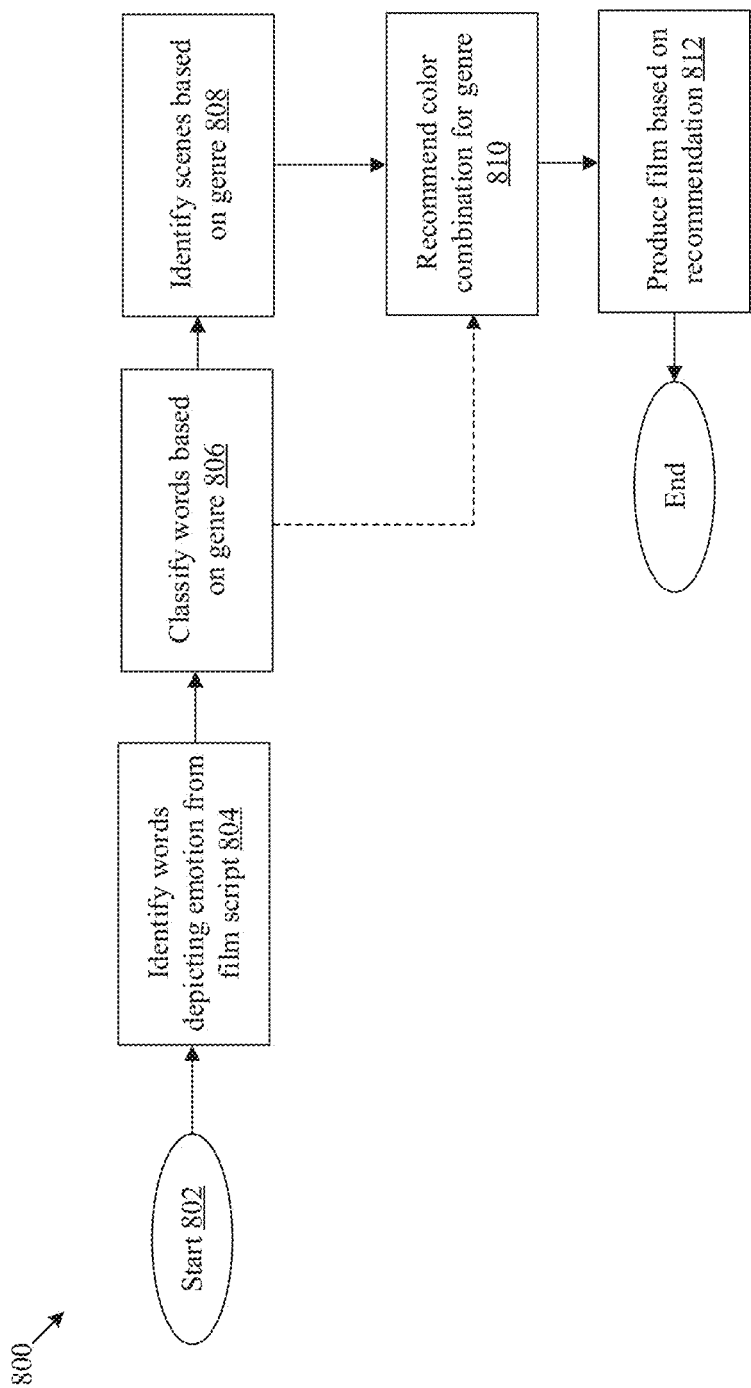
FIG. 8 is a block diagram that illustrates exemplary operations for genre-wise recommendation of colors to be used in a film based on analysis of a film script, in accordance with an embodiment of the disclosure.

FIG. 8 is a block diagram that illustrates exemplary operations for genre-wise recommendation of colors to be used in a film based on analysis of a film script, in accordance with an embodiment of the disclosure. FIG. 8 is explained in conjunction with elements from FIGS. 1, 2, 3, 4, 5, 6, and 7. With reference to FIG. 8, there is shown a block diagram 800. The operations from 802 to 812 may be implemented on the information processing device 102. The operations may start at 802 and proceed to 804.

At 804, a group of words depicting emotions may be identified in a scene of the film script (such as the film script 602A). For example, use of red color in a scene of the film script may symbolize anger, love, or hatred. The information processing device 102 may analyze (NLP analysis) the film script to identify the group of words (or even influential sentences) depicting emotions in a scene of the film script.

At 806, the identified group of words may be classified based on a genre associated with the scene (or the entire film script) or a tonality of dialogues in the scene.

At 808, a plurality of scenes may be identified in the film script based on a genre associated with each of the plurality of scenes.

At 810, a color combination may be recommended for objects (e.g., costumes, background color, color of props, etc.) to be included in the scene of a film to be produced based on the film script. The color combination may be recommended based on the classification at 806 (and/or the identification at 808).

In an embodiment, the recommended color combination may include a selection of most suitable colors to be used in the production of the film (based on the film script) for a positive impact on viewers for that specific genre. For example, a color combination may be recommended for props to be used in a scene or costume colors of characters in scenes. Additionally, color grading or color balancing suggestions may be recommended for different scenes of the film script.

At 812, the film may be produced based on the recommendations at 810 and the operations may end.

Figure 9:
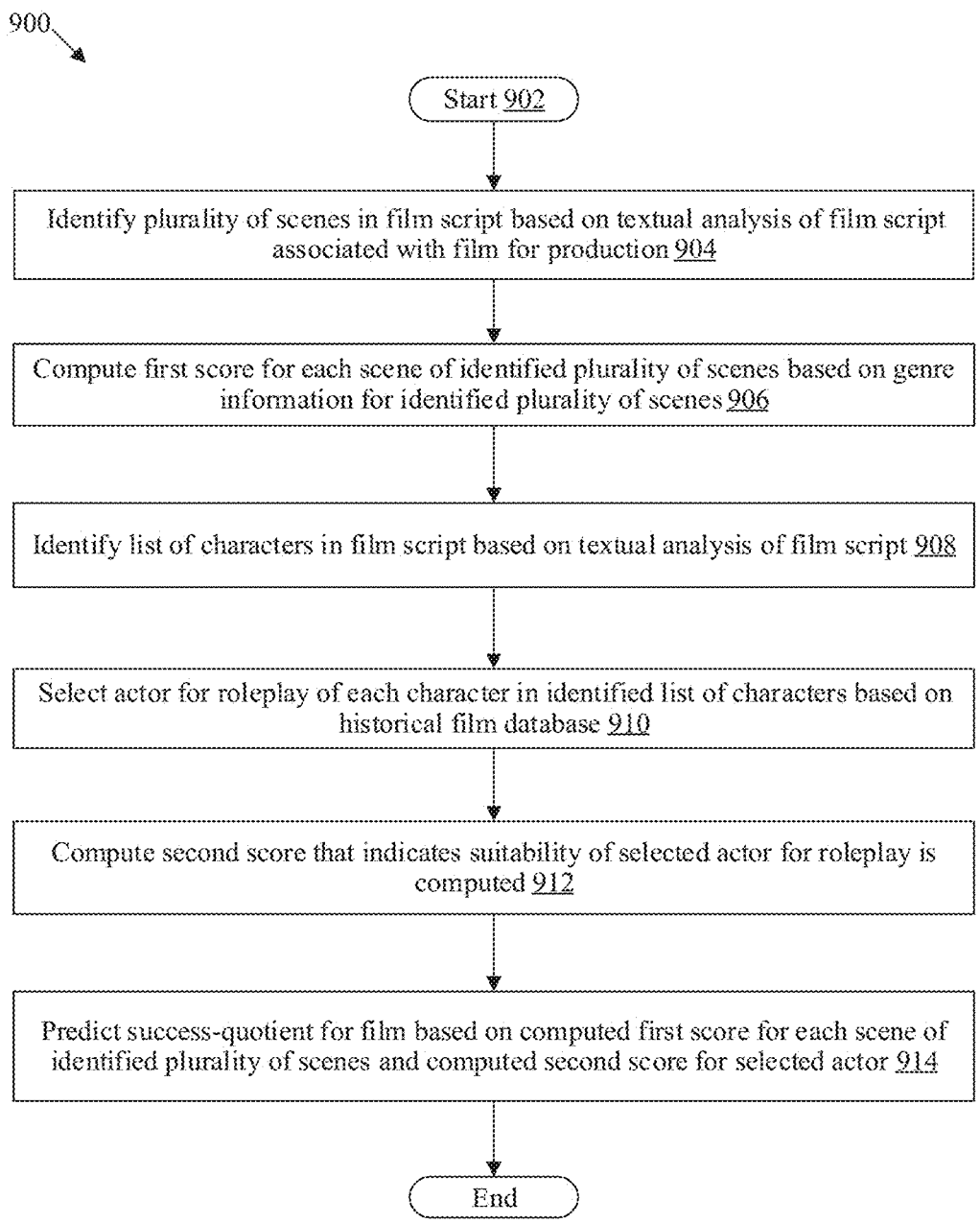
FIG. 9 is a flowchart that illustrates exemplary operations for prediction of a film's success-quotient, in accordance with an embodiment of the disclosure.

FIG. 9 is a flowchart that illustrates exemplary operations for prediction of a film's success-quotient, in accordance with an embodiment of the disclosure. FIG. 8 is explained in conjunction with elements from FIGS. 1, 2, 3, 4, 5, 6, 7, and 8. With reference to FIG. 9, there is shown a flowchart 900. The operations from 902 to 914 may be implemented on the information processing device 102. The operations may start at 902 and proceed to 904.

At 904, a plurality of scenes in a film script may be identified based on a textual analysis of the film script associated with a film for production. In accordance with an embodiment, the circuitry 202 of the information processing device 102 may be configured to identify the plurality of scenes in the film script based on the textual analysis of the film script.

At 906, a first score for each scene of identified plurality of scenes may be computed. The first score may be computed based on the genre information for the identified plurality of scenes. In accordance with an embodiment, the circuitry 202 of the information processing device 102 may be configured to compute the first score for each scene of the identified plurality of scenes based on the genre information for the identified plurality of scenes.

At 908, a list of characters may be identified based on the textual analysis of the film script. In accordance with an embodiment, the circuitry 202 may be configured to identify the list of characters in the film script based on the textual analysis of the film script.

At 910, an actor may be selected for a roleplay of each character in the identified list of characters based on a historical film database. In accordance with an embodiment, the circuitry 202 may be configured to select the actor for the roleplay of each character in the identified list of characters based on the historical film database.

At 912, a second score that indicates suitability of the selected actor for roleplay may be computed. The second score may be computed based on the ML model 110 that may be trained on datapoints of the historical film database. In accordance with an embodiment, the circuitry 202 may be configured to compute the second score as an indicator of the suitability of the selected actor for the roleplay.

At 914, a success-quotient for the film may be predicted based on the computed first score for each scene in the identified plurality of scenes and the computed second score for the selected actor. In accordance with an embodiment, the circuitry 202 may be configured to predict the success-quotient for the film based on the computed first score for each scene of the identified plurality of scenes and the computed second score for the selected actor. Control may pass to end.

Figure 10:
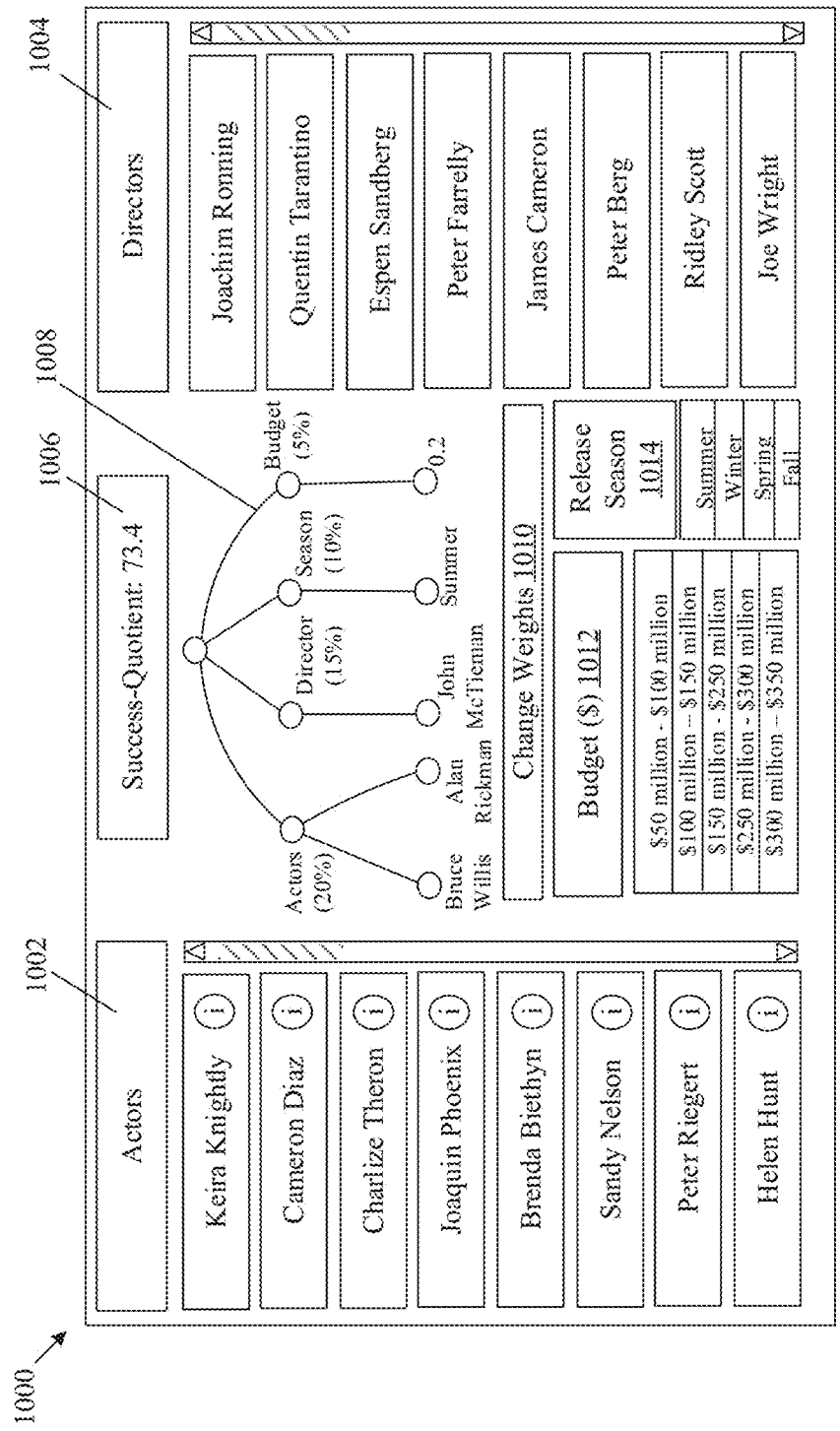
FIG. 10 is a diagram that illustrates a user interface for simulation and analysis of a success-quotient of films, in accordance with at least one embodiment of the disclosure.

FIG. 10 is a diagram that illustrates a user interface for simulation and analysis of a success-quotient of films, in accordance with at least one embodiment of the disclosure. FIG. 10 is explained in conjunction with elements from FIGS. 1, 2, 3, 4, 5, 6, 7, 8 and 9. With reference to FIG. 10, there is shown a user interface (UI) 1000. The UI 1000 includes a UI element 1002 which displays a potential list of actors from which actors may be selected as cast member for a film which includes characters identified from NLP analysis of the film script. The UI 1000 further includes a UI element 1004 which displays a potential list of directors from which one or more directors may be selected as a primary crew for production of the film. The UI 1000 further includes a UI element 1006 for display of a success-quotient predicted for the film script and a UI element 1008 which lists parameters to be considered for prediction of the success-quotient. The UI 1000 further includes a UI element 1010 to view and modify weights for the parameters considered for the prediction of the success-quotient, a UI element 1012 to view and select a tentative budget (in million US Dollar) for the film, and a UI element 1014 to select a release season for the film.

The UI 1000 may be a front-end UI of a simulation application which may help a user to fine-tune the parameters (in the UI element 1008 for e.g. the cast and crew) to understand an impact of such parameters in the prediction of the success-quotient. From such understanding, the user may decide to select optimal parameters to improve the success quotient for the film. As shown, for example, for the Diehard movie, the user may drag and drop the actors from the UI element 1002 and directors from the UI element 1004 to visualize how the success-quotient changes.

Through the UI element 1002, the UI element 1004, the UI element 1012, and the UI element 1014, parameters and values of such parameters to be considered for the prediction of the success-quotient may be selected. Similarly, through the UI element 1010, weights for the selected parameters may be specified. The success-quotient may be predicted and updated in the UI element 1006 based on the specified weights and selected the parameters/parameter values.

It should be noted that parameters, namely, actors, directors, season and budget are shown for reference and should not be construed as limiting for the disclosure. The present disclosure may be applicable to more or less number of parameters with different variations in values, without a deviation from the scope of the present disclosure.

It should be further noted that the UI 1000 is merely provided as an example implementation for simulation and analysis of a success-quotient of films and should not be construed as limiting for the disclosure. The present disclosure may be applicable other variations in presentation of UI elements on the UI 1000, without a deviation from the scope of the disclosure.

FIG. 11 is a diagram that illustrates a user interface (UI) element for visualization of actor details through the UI of FIG. 10, in accordance with at least one embodiment of the disclosure. FIG. 11 is explained in conjunction with elements from FIGS. 1, 2, 3, 4, 5, 6, 7, 8, 9, and 10. With reference to FIG. 11, there is shown the UI 1000 and a UI element 1100 overlaid on the UI 1000 of FIG. 10. The UI element 1100 may be displayed based on a user input over one of the list of actors in the UI element 1002. The UI element 1100 may include a detailed profile of the selected actor (or director). Such profile may include, for example, personal details, a photograph of the actor, genre-wise hits, popularity region-wise, a list of highest-grosser films of the actor, roles which resulted in most hits at the box-office, and social media statistics, such as likes on various social media platform.

It should be noted that the UI element 1100 is merely provided as an example implementation for visualization of actor/direction details and should not be construed as limiting for the disclosure. The present disclosure may be applicable other variations in presentation of text, images, graphics, or buttons on the UI element 1100, without a deviation from the scope of the disclosure.

Figure 12:
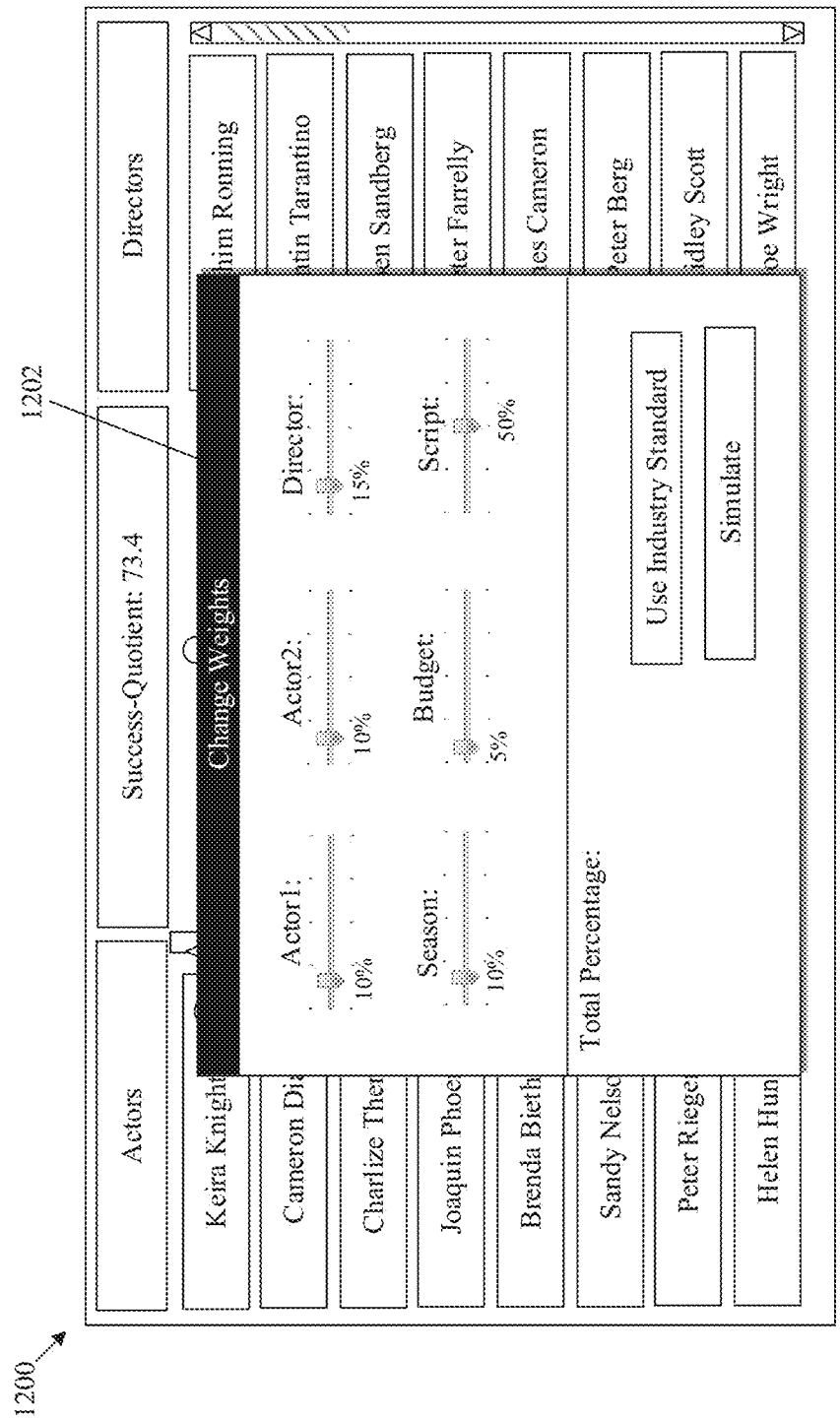
FIG. 12 is a diagram that illustrates a user interface (UI) element for selection of weights through the UI of FIG. 10 for parameters considered for prediction of a success-quotient of a film, in accordance with at least one embodiment of the disclosure.

FIG. 12 is a diagram that illustrates a user interface (UI) element for selection of weights through the UI of FIG. 10 for parameters considered for prediction of a success-quotient of a film, in accordance with at least one embodiment of the disclosure. FIG. 12 is explained in conjunction with elements from FIGS. 1, 2, 3, 4, 5, 6, 7, 8, 9, 10, and 11. With reference to FIG. 12, there is shown the UI 1000 and a UI element 1200 overlaid on the UI 1000 of FIG. 10. The UI element 1200 may be displayed based on a selected of the UI element 1010 to view and modify the weights for the parameters considered for the prediction of the success-quotient. For example, the user may use slide bars to select a weight of 10% for the actor1, another 10% for actor2, 15% for the director, 10% for the release season, 5% for the budget, and 50% for the film script. Upon selection of a UI button "use industry standard", the weights may be modified based on a default profile of weights obtained from analysis of past films. Upon selection of a UI button "simulate", the weights modified based the slide bars may be saved and used for the prediction of the success-quotient for the film.

It should be noted that the UI element 1200 is merely provided as an example implementation for weight selection/modification and should not be construed as limiting for the disclosure. The present disclosure may be applicable other variations in presentation of text, images, graphics, or buttons on the UI element 1200, without a deviation from the scope of the disclosure.

Various embodiments of the disclosure may provide a non-transitory computer readable medium and/or storage medium having stored thereon, instructions executable by a machine and/or a computer to operate an information processing device. The instructions may cause the machine and/or computer to perform operations that include identification of a plurality of scenes in a film script based on textual analysis of the film script associated with a film for production. The operations further include computation of a first score for each scene of the identified plurality of scenes based on genre information for the identified plurality of scenes and identification of a list of characters in the film script based on the textual analysis of the film script. The operations further include selection of an actor for roleplay of each character in the identified list of characters based on a historical film database and for the selected actor, computation of a second score that indicates a suitability of the selected actor for the roleplay. The second score is computed based on a machine learning model that is trained on datapoints of the historical film database. The operations further include prediction of a success-quotient for the film based on the computed first score for each scene of the identified plurality of scenes and the computed second score for the selected actor.

Exemplary aspects of the disclosure may include an information processing device (such as the information processing device 102 of FIG. 1). The information processing device 102 may include circuitry (such as the circuitry 202) and a memory (such as the memory 204) configured to store a machine learning (ML) model. The circuitry may be configured to receive a film script (such as the film script 402A) from a user device (such as the user device 104). The circuitry may be configured to identify a plurality of scenes in a film script based on textual analysis of the film script which is associated with a film for production. The circuitry may be configured to compute a first score for each scene of the identified plurality of scenes based on genre information for the identified plurality of scenes and identify a list of characters in the film script based on the textual analysis of the film script. The circuitry may be further configured to select an actor for a roleplay of each character in the identified list of characters based on a historical film database (such as the historical film database 406C). The circuitry may be further configured to compute the second score for the selected actor based on a machine learning model that is trained on datapoints of the historical film database. Thereafter, based on the computed first score for each scene of the identified plurality of scenes and the computed second score for the selected actor, the circuitry may be configured to predict a success-quotient for the film.

In accordance with an embodiment, the circuitry may be further configured to identify a distribution of the identified list of characters across the identified plurality of scenes based on the textual analysis of the film script. Based on the identified distribution, the circuitry may be configured to compute the first score for each scene of the identified plurality of scenes.

In accordance with an embodiment, the circuitry may be further configured to determine a depiction of a celebratory event or a seasonal event in one or more scenes of the identified plurality of scenes, based on the textual analysis of the film script. The circuitry may be further configured to compute a third score for the determined depiction based on the historical film database and predict the success-quotient for the film further based on the computed third score for the determined depiction in the one or more scenes. In accordance with an embodiment, the circuitry may be further configured to estimate a release date for the film based on the determined depiction of the celebratory event or the seasonal event. For the estimated release date, the circuitry may be further configured to compute a fourth score and predict the success-quotient for the film further based on the computed fourth score.

In accordance with an embodiment, the circuitry may be further configured to select, from the historical film database, a list of primary crew members and compute a fifth score for each primary crew member in the list of primary crew members. The computed fifth score may indicate the suitability of a corresponding primary crew member for a job in the production of the film and may be computed based on the machine learning model that is trained on the datapoints of the historical film database. In accordance with an embodiment, the circuitry may be further configured to predict the success-quotient for the film further based on the computed fifth score for each primary crew member in the selected list of primary crew members.

In accordance with an embodiment, the circuitry may be further configured to recommend the selected list of primary crew members as a production crew for the film based on a determination that the predicted success-quotient is greater than a threshold value. Similarly, the circuitry may be further configured to recommend the selected actor as a cast member for the film based on a determination that the predicted success-quotient is greater than a threshold value. Alternatively, the circuitry may be further configured to select a different actor for the roleplay of each character in the identified list of characters based on a determination that the predicted success-quotient is below a threshold value.

In accordance with an embodiment, the circuitry may be further configured to identify one or more lead characters in the identified list of characters based on the textual analysis of the film script. The circuitry may be configured to compute the second score for the selected actor further based on a determination that the selection of the actor is for the roleplay of one of the identified one or more lead characters.

In accordance with an embodiment, the circuitry may be further configured to identify a set of production variables based on the textual analysis of the film script. The set of production variables may include a number of scene locations, a number of scenes, and a number of characters in the film script. Additionally, the circuitry may be configured to determine a budget and a filming duration for the production of the film. Thereafter, the circuitry may be further configured to predict the success-quotient for the film further based on a first weight for the identified set of production variables, a second weight for the determined filming duration, and a third weight for the determined budget.

In accordance with an embodiment, the circuitry may be further configured to estimate a popularity-measure of a context or a genre of at least one scene of the identified plurality of scenes based on analysis of social media activities of users and past activities of the users for past films. The circuitry may be further configured to predict the success-quotient for the film further based on the estimated popularity-measure.

In accordance with an embodiment, the circuitry may be configured to extract a set of tonal features based on the textual analysis of the film script. The extracted set of tonal features may correspond to one or more of a narration or a state of a character, a text capitalization, an exclamation, a rhythm, a cadence, or an inflection in the film script. The circuitry may be further configured to compute a first tonal metric for each scene of the identified plurality of scenes based on the extracted set of tonality features. The circuitry may be further configured to compute a second tonal metric for a first character of the identified list of characters. The second tonal metric may depict a variation in tonal levels associated with a role of the first characters throughout the identified plurality of scenes of the film script. The tonal levels may include one or more of guilt, joy, sadness, shame, disgust, anger, and fear. The circuitry may be further configured to compute a third tonal metric corresponding to a variation of the tonal levels of the film script. The circuitry may be further configured to predict the success-quotient for the film further based on the computed first tonal metric, the computed second tonal metric, or the computer third tonal metric.

In accordance with an embodiment, the circuitry may be configured to extract scoring information including a success-quotient for each past film of a plurality of past films from the historical film database. The circuitry may be further configured to determine a first set of genre-wise scores for each past film of the plurality of past films based on the extracted scoring information. The circuitry may be further configured to normalize the determined first set of genre-wise scores. The circuitry may be further configured to collect statistical information comprising sales information, ratings information, and social media footprints for each past film of the plurality of past films. The circuitry may be further configured to compute a score value for each of the collected sales information, the ratings information, and the social media footprints. The circuitry may be further configured to validate the normalized first set of genre-wise scores for each past film of the plurality of past films based on the computed score values for a respective past film of the plurality of past films. The circuitry may be further configured to generate a clustering model as an industry-wide baseline model for films. The cluttering model may be generated based on application of a distance-based clustering method on validated set of genre-wise scores for each past film of the plurality of past films. The generated clustering model may include the plurality of past films as a plurality of datapoint clusters which is clustered around a corresponding plurality of cluster centroids.

In accordance with an embodiment, the circuitry may be configured to determine a second set of genre-wise scores for the film script based on the predicted success-quotient.

The circuitry may be further configured to determine whether the film script corresponds to a datapoint in a first datapoint cluster of the generated clustering model or corresponds to an outlier datapoint. The determination may be based on the determined second set of genre-wise scores. The circuitry may be further configured to generate a comparison metric for the film script based on the determination.

In accordance with an embodiment, the machine learning model may be a Deep Neural Network (DNN) (such as the DNN 502) that includes a plurality of layers. The circuitry may be configured to input a dataset which includes the genre information, the identified plurality of scenes, and the identified list of characters to an input layer (such as the input layer 506) of the plurality of layers. An intermediate layer of the DNN may be configured to compute the first score for each scene of the identified plurality of scenes and the second score for the actor selected for the roleplay of each character in the identified list of characters. The success-quotient may be predicted for the film as output of an output layer (such as the output layer 514) of the DNN based on the computed first score and the computed second score.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. An information processing device, comprising:
a memory configured to store a machine learning model that is a deep neural network (DNN) comprising a plurality of layers, wherein the machine learning model is trained on datapoints of a historical film database; and
circuitry configured to:
receive, via a communication network, a film script from a specific device of a user;
identify a plurality of scenes in the film script based on textual analysis of the film script which is associated with a film for production;
identify a list of characters in the film script based on the textual analysis of the film script;
identify genre information associated with each of the plurality of scenes;
select, based on the identified genre information and the historical film database, a list of actors for a roleplay of the identified list of characters; and
input a dataset comprising the identified plurality of scenes, the identified list of characters, and genre information associated with the identified plurality of scenes to an input layer of the plurality of layers of the DNN, wherein
an output of the input layer is a weighted input based on the inputted dataset,
a first intermediate layer of the plurality of layers of the DNN is configured to:
receive the weighted input from the input layer;
identify, based on the weighted input, a set of production variables that comprises a number of scene locations, a number of scenes, and a number of characters in the film script; and
determine, based on the weighted input, a budget and a filming duration for production of the film,
a second intermediate layer of the plurality of layers of the DNN is configured to:
compute a first score for each scene of the identified plurality of scenes based on the genre information;
compute, for each actor in the selected list of actors, a second score that indicates a suitability of each actor for the roleplay; and
compute, based on the trained datapoints of the machine learning model, a first weight for the identified set of production variables, a second weight for the determined budget, and a third weight for the determined filming duration,
an output layer of the plurality of layers of the DNN is configured to predict a success-quotient for the film based on a weighted average of each the computed first score for each scene of the identified plurality of scenes, the computed second score for the selected list of actors the first weight, the second weight, and the third weight, and
the predicted success-quotient is a measure of a success of the film based on the film script,
determine the predicted success-quotient is greater than a specific threshold value;
output, based on the determination that the predicted success-quotient of the film is greater than the specific threshold value, the received film script as an optimal film script for production to the specific device of the user; and
output, based on the determination that the predicted success-quotient of the film is greater than the specific threshold value, the selected list of actors as an optimal list of cast members of the film for production.

2. The information processing device according to claim 1, wherein the circuitry is further configured to:
identify a distribution of the identified list of characters across the identified plurality of scenes based on the textual analysis of the film script; and
compute the first score for each scene of the identified plurality of scenes based on the identified distribution.

3. The information processing device according to claim 1, wherein the circuitry is further configured to determine a depiction of a celebratory event or a seasonal event in one or more scenes of the identified plurality of scenes, based on the textual analysis of the film script.

4. The information processing device according to claim 3, wherein the circuitry is further configured to:
compute a third score for the determined depiction based on the historical film database; and
predict the success-quotient for the film based on the computed third score for the determined depiction in the one or more scenes.

5. The information processing device according to claim 3, wherein the circuitry is further configured to:
estimate a release date for the film based on the determined depiction of the celebratory event or the seasonal event;
compute a fourth score for the estimated release date; and
predict the success-quotient for the film based on the computed fourth score.

6. The information processing device according to claim 1, wherein the circuitry is further configured to:
select, from the historical film database, a list of primary crew members; and
compute a fifth score for each primary crew member in the list of primary crew members, wherein
the computed fifth score indicates the suitability of a corresponding primary crew member in the list of primary crew members for a job in the production of the film, and
the fifth score is computed based on the machine learning model that is trained on the datapoints of the historical film database.

7. The information processing device according to claim 6, wherein the circuitry is further configured to predict the success-quotient for the film based on the computed fifth score for each primary crew member in the selected list of primary crew members.

8. The information processing device according to claim 7, wherein the circuitry is further configured to recommend the selected list of primary crew members as a production crew for the film based on the predicted success-quotient that is greater than the specific threshold value.

9. The information processing device according to claim 1, wherein the circuitry is further configured to:
extract a set of tonal features based on the textual analysis of the film script;
compute a first tonal metric for each scene of the identified plurality of scenes based on the extracted set of tonal features;
compute a second tonal metric for a first character of the identified list of characters, wherein the second tonal metric depicts a variation in tonal levels associated with a role of the first character throughout the identified plurality of scenes of the film script;
compute a third tonal metric corresponding to a variation of the tonal levels of the film script; and
predict the success-quotient for the film based on at least one of the computed first tonal metric, the computed second tonal metric, or the computed third tonal metric.

10. The information processing device according to claim 9, wherein the tonal levels comprise at least one of guilt, joy, sadness, shame, disgust, anger, or fear.

11. The information processing device according to claim 9, wherein the extracted set of tonal features corresponds to at least one of a narration or a state of the first character, a text capitalization, an exclamation, a rhythm, a cadence, or an inflection in the film script.

12. The information processing device according to claim 1, wherein the circuitry is further configured to:
identify one or more lead characters in the identified list of characters based on the textual analysis of the film script; and
compute the second score for an actor in the selected list of actors based on a determination that the selection of the actor is for the roleplay of one of the identified one or more lead characters.

13. The information processing device according to claim 1, wherein the circuitry is further configured to:
estimate a popularity-measure of a context or a genre of at least one scene of the identified plurality of scenes based on analysis of social media activities of users and past activities of the users for past films; and
predict the success-quotient for the film based on the estimated popularity-measure.

14. The information processing device according to claim 1, wherein the circuitry is further configured to select a different actor for the roleplay of each character in the identified list of characters based on the predicted success-quotient that is below the specific threshold value.

15. The information processing device according to claim 1, wherein the circuitry is further configured to:
extract, from the historical film database, scoring information comprising the success-quotient for each past film of a plurality of past films;
determine a first set of genre-wise scores for each past film of the plurality of past films based on the extracted scoring information;
normalize the determined first set of genre-wise scores;
collect statistical information comprising sales information, ratings information, and social media footprints for each past film of the plurality of past films;
compute a score value for each of the sales information, the ratings information, and the social media footprints;
validate the normalized first set of genre-wise scores for each past film of the plurality of past films based on the computed score value for a respective past film of the plurality of past films; and
generate a clustering model as an industry-wide baseline model for the plurality of past films based on application of a distance-based clustering method on the validated first set of genre-wise scores for each past film of the plurality of past films,
wherein the generated clustering model includes the plurality of past films as a plurality of datapoint clusters which is clustered around a corresponding plurality of cluster centroids.

16. The information processing device according to claim 15, wherein the circuitry is further configured to:
determine a second set of genre-wise scores for the film script based on the predicted success-quotient;
determine, based on the determined second set of genre-wise scores, whether the film script corresponds to a datapoint in the plurality of datapoint clusters of the generated clustering model or corresponds to an outlier datapoint; and
generate a comparison metric for the film script based on the determination whether the film script corresponds to the datapoint in the plurality of datapoint clusters of the generated clustering model or corresponds to the outlier datapoint.

17. The information processing device according to claim 1, wherein the circuitry is further configured to:
identify a group of words depicting emotions in a scene of the identified plurality of scenes of the film script;
classify the identified group of words based on a genre associated with the scene of the film script or a tonality of dialogues in the scene; and recommend, based on the classification, a color combination for objects to be included in the scene of the film.

18. A method, comprising:

in an information processing device that includes circuitry and a memory configured to store a machine learning model that is a deep neural network (DNN) comprising a plurality of layers, wherein the machine learning model is trained on datapoints of a historical film database:
  receiving, by the circuitry, a film script from a specific device of a user via a communication network;
  identifying, by the circuitry, a plurality of scenes in the film script based on textual analysis of the film script associated with a film for production;
  identifying, by the circuitry, a list of characters in the film script based on the textual analysis of the film script;
  identifying, by the circuitry, genre information associated with each of the plurality of scenes;
  selecting, by the circuitry, a list of actors for roleplay of the identified list of characters, based on the identified genre information and the historical film database;
  inputting, by the circuitry, a dataset comprising the identified plurality of scenes, the identified list of characters, and genre information associated with the identified plurality of scenes to an input layer of the plurality of layers of the DNN, wherein an output of the input layer is a weighted input based on the inputted dataset;
  receiving, by a first intermediate layer of the plurality of layers of the DNN, the weighted input from the input layer;
  identifying, by the first intermediate layer, a set of production variables that comprises a number of scene locations, a number of scenes, and a number of characters in the film script, based on the weighted input;
  determining, based on the weighted input, a budget and a filming duration for production of the film;
  computing, by a second intermediate layer of the plurality of layers of the DNN, a first score for each scene of the identified plurality of scenes based on the genre information;
  computing, by the second intermediate layer, for each actor in the selected list of actors, a second score that indicates a suitability of each actor for the roleplay;
  computing, by the second intermediate layer, a first weight for the identified set of production variables, a second weight for the determined budget, and a third weight for the determined filming duration, based on the trained datapoints of the machine learning model;
  predicting, by an output layer of the plurality of layers of the DNN, a success-quotient for the film based on a weighted average of each of the computed first score for each scene of the identified plurality of scenes, the computed second score for the selected list of actors, the first weight, the second weight, and the third weight, wherein the predicted success-quotient is a measure of a success of the film based on the film script;
  determining, by the circuitry, the predicted success-quotient is greater than a specific threshold value;
  outputting, by the circuitry, the received film script as an optimal film script for production to the specific device of the user, based on the determination that the predicted success-quotient of the film is greater than the specific threshold value; and
  outputting, by the circuitry, the selected list of actors as an optimal list of cast members of the film for production, based on the determination that the predicted success-quotient of the film is greater than the specific threshold value.

19. A non-transitory computer-readable medium having stored thereon, computer implemented instructions that when executed by an information processing device, causes the information processing device to execute operations, the operations comprising:
  receiving a film script from a specific device of a user via a communication network;
  identifying a plurality of scenes in the film script based on textual analysis of the film script associated with a film for production;
  identifying a list of characters in the film script based on the textual analysis of the film script;
  identifying genre information associated with each of the plurality of scenes;
  selecting a list of actors for roleplay of the identified list of characters, based on the identified genre information and a historical film database, wherein the information processing device includes a memory configured to store a machine learning model that is a deep neural network (DNN) comprising a plurality of layers, and the machine learning model is trained on datapoints of the historical film database;
  inputting a dataset comprising the identified plurality of scenes, the identified list of characters, and genre information associated with the identified plurality of scenes to an input layer of the plurality of layers of the DNN, wherein an output of the input layer is a weighted input based on the inputted dataset;
  receiving, by a first intermediate layer of the plurality of layers of the DNN, the weighted input from the input layer;
  identifying, by the first intermediate layer, a set of production variables that comprises a number of scene locations, a number of scenes, and a number of characters in the film script, based on the weighted input;
  determining, based on the weighted input, a budget and a filming duration for production of the film;
  computing, by a second intermediate layer of the plurality of layers of the DNN, a first score for each scene of the identified plurality of scenes based on the genre information;
  computing, by the second intermediate layer, for each actor in the selected list of actors, a second score that indicates a suitability of each actor for the roleplay;
  computing, by the second intermediate layer, a first weight for the identified set of production variables, a second weight for the determined budget, and a third weight for the determined filming duration, based on the trained datapoints of the machine learning model;
  predicting, by an output layer of the plurality of layers of the DNN, a success-quotient for the film based on a weighted average of each of the computed first score for each scene of the identified plurality of scenes, the computed second score for the selected list of actors, the first weight, the second weight, and the third weight, wherein the predicted success-quotient is a measure of a success of the film based on the film script;
  determining the predicted success-quotient is greater than a specific threshold value;
  outputting, based on the determination that the predicted success-quotient of the film is greater than the specific threshold value, the received film script as an optimal film script for production to the specific device of the user; and outputting, based on the determination that the predicted success-quotient of the film is greater than the specific threshold value, the selected list of actors as an optimal list of cast members of the film for production.

\* \* \* \* \*